United States Patent
Katayama et al.

(10) Patent No.: US 6,980,505 B2
(45) Date of Patent: Dec. 27, 2005

(54) OPTICAL HEAD APPARATUS INCLUDING TWO LIGHT SOURCES AND ONE PHOTODETECTOR

(75) Inventors: Ryuichi Katayama, Tokyo (JP); Eiichi Ueda, Tokyo (JP); Taku Tsuboi, Tokyo (JP)

(73) Assignee: NEC Corporation, Tokyo (JP)

( * ) Notice: Subject to any disclaimer, the term of this patent is extended or adjusted under 35 U.S.C. 154(b) by 450 days.

(21) Appl. No.: 10/244,800

(22) Filed: Sep. 16, 2002

(65) Prior Publication Data

US 2003/0053397 A1 Mar. 20, 2003

(30) Foreign Application Priority Data

Sep. 19, 2001 (JP) .............................. 2001-285208

(51) Int. Cl.[7] ............................................. G11B 7/135

(52) U.S. Cl. .............................. 369/112.17; 369/44.23; 369/112.28; 369/112.16

(58) Field of Search ...................... 369/112.17, 44.23, 369/44.37, 112.01, 112.16, 112.28, 112.22, 369/112.21, 110.01, 110.02

(56) References Cited

U.S. PATENT DOCUMENTS

| | | | |
|---|---|---|---|
| 6,034,939 A * | 3/2000 | Takasawa et al. ...... | 369/112.17 |
| 6,222,812 B1 * | 4/2001 | Yoo et al. .............. | 369/112.16 |
| 6,392,977 B2 * | 5/2002 | Ando et al. ............ | 369/112.01 |
| 6,396,791 B1 * | 5/2002 | Wakao et al. .......... | 369/112.29 |
| 6,584,061 B2 * | 6/2003 | Yanagisawa et al. .. | 369/112.17 |

FOREIGN PATENT DOCUMENTS

| | | |
|---|---|---|
| JP | 5-100114 | 4/1993 |
| JP | 08-055363 | 2/1996 |
| JP | 09-204683 | 8/1997 |
| JP | 10-112056 | 4/1998 |
| JP | 10-134394 | 5/1998 |
| JP | 10-228668 | 8/1998 |
| JP | 10-255317 | 9/1998 |
| JP | 2000-284120 | 10/2000 |

* cited by examiner

*Primary Examiner*—William Korzuch
*Assistant Examiner*—Van T. Pham
(74) *Attorney, Agent, or Firm*—Muirhead and Saturnelli, LLC

(57) ABSTRACT

In an optical head apparatus including a first light source for emitting a first light beam having a first wavelength, a second light source for emitting a second light beam having a second wavelength different from the first wavelength, an objective lens, a photodetector, and first and second optical combining/splitting elements, the first optical combining/splitting element receives the first light beam from the first light source to outgo most of the first light beam therefrom to the second optical combining/splitting element and receives the first and second light beams from the second optical combining/splitting element to outgo most of the first and second light beams therefrom to the photodetector. The second optical combining/splitting element receives the first light beam from the first optical combining/splitting element and the second light beam from the second light source to outgo most of the first and second light beams therefrom to the objective lens and receives the first and second light beams from the objective lens to outgo most of the first and second light beams therefrom to the first optical combining/splitting element.

25 Claims, 17 Drawing Sheets

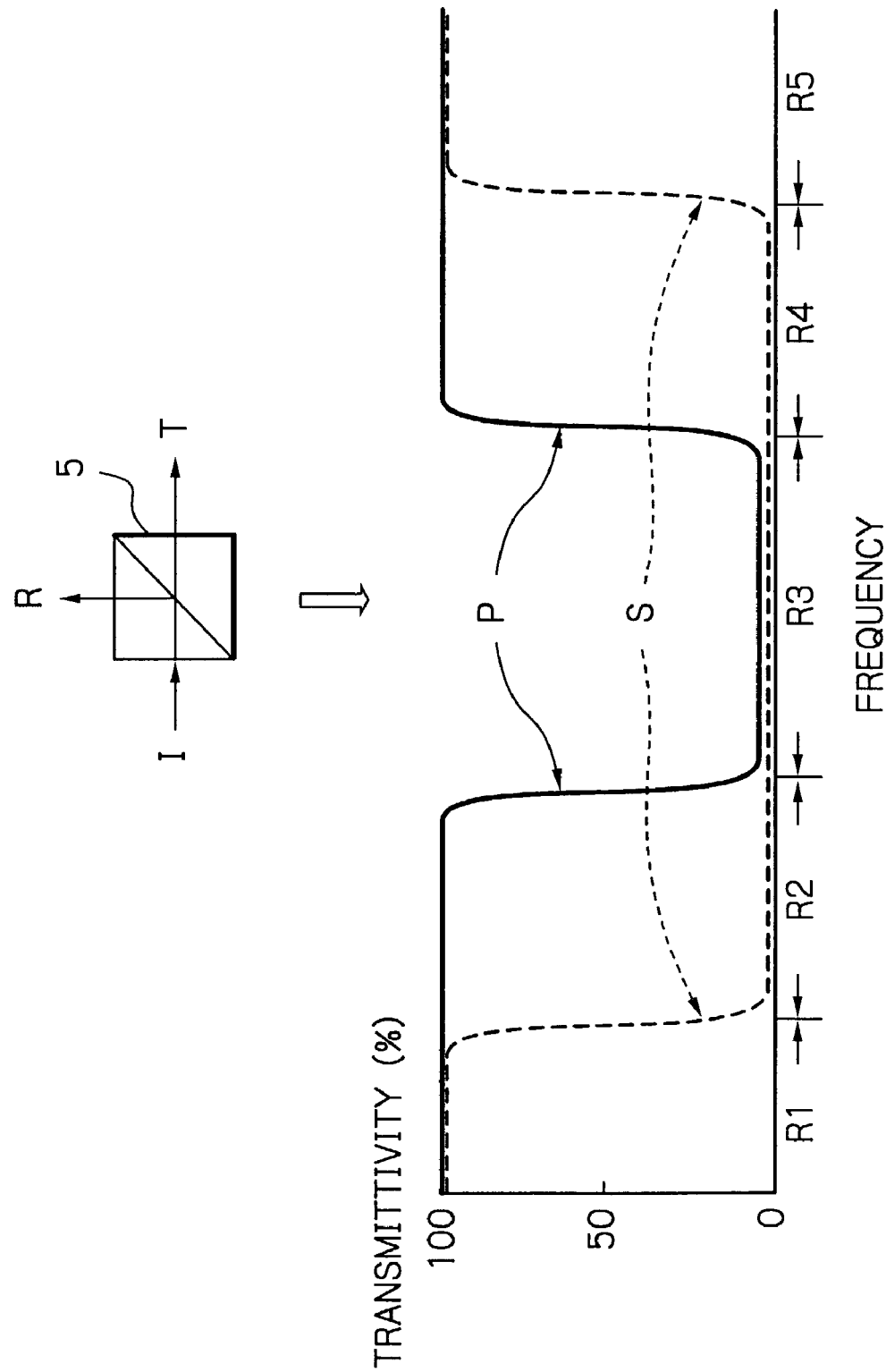

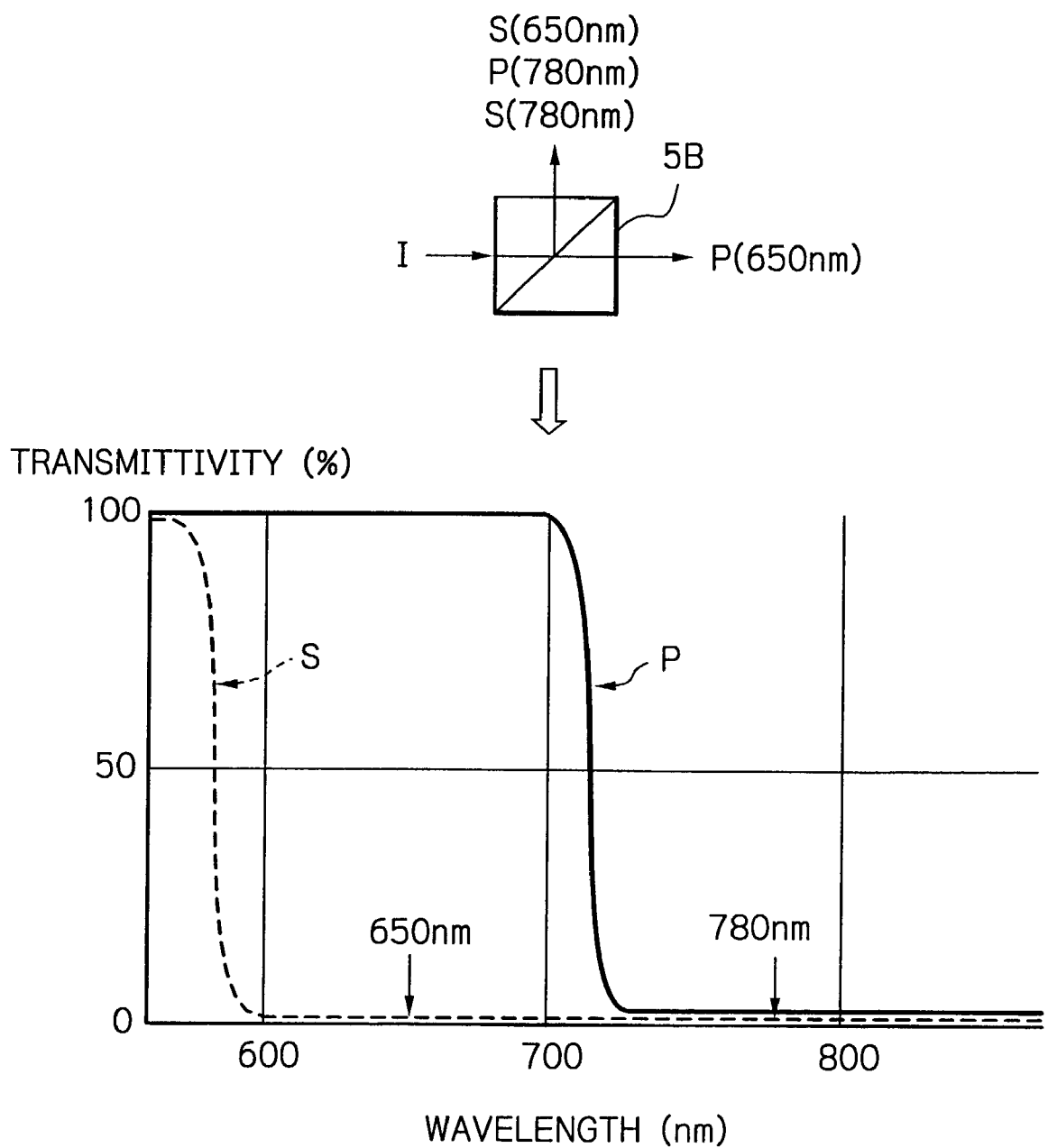

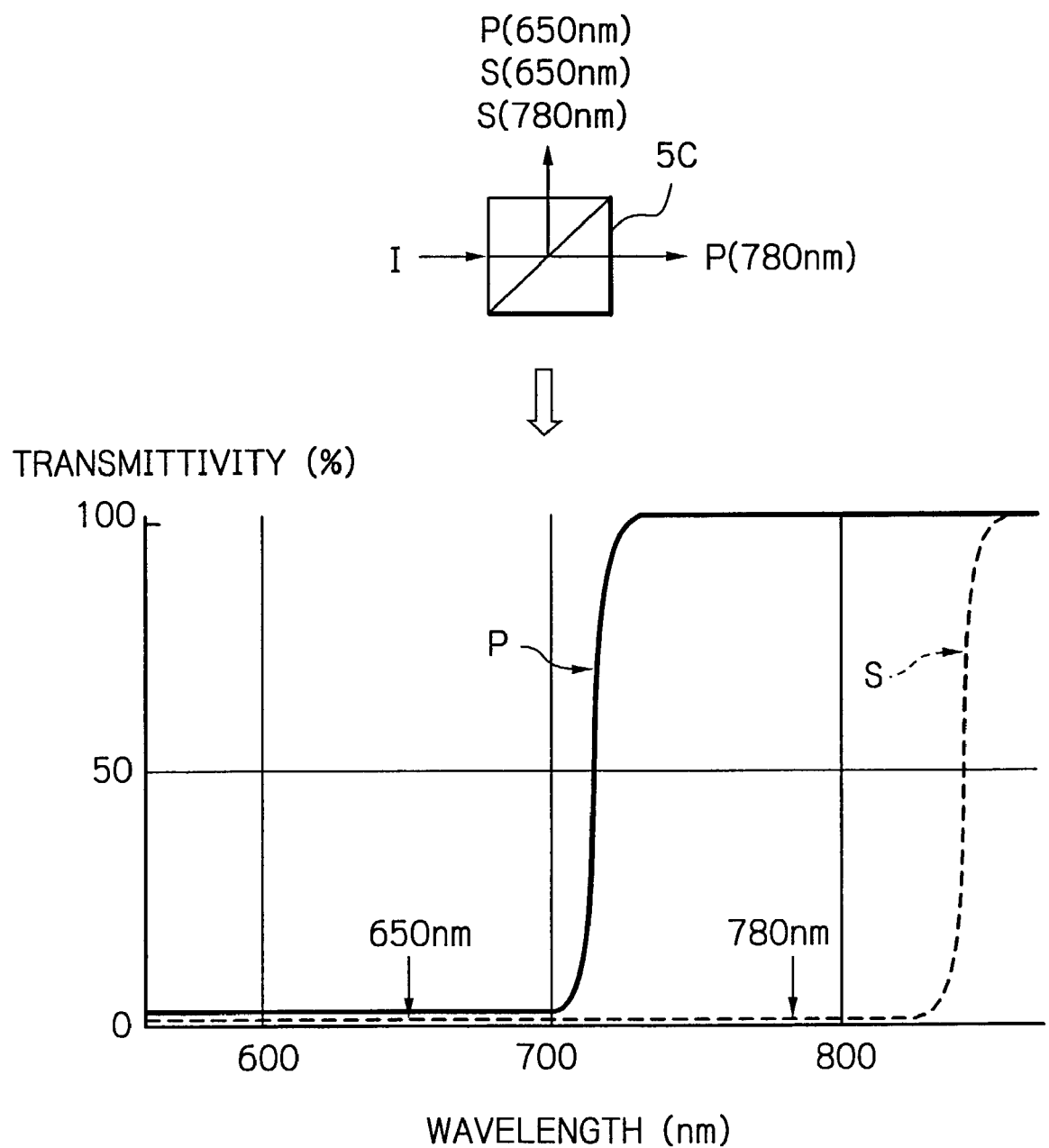

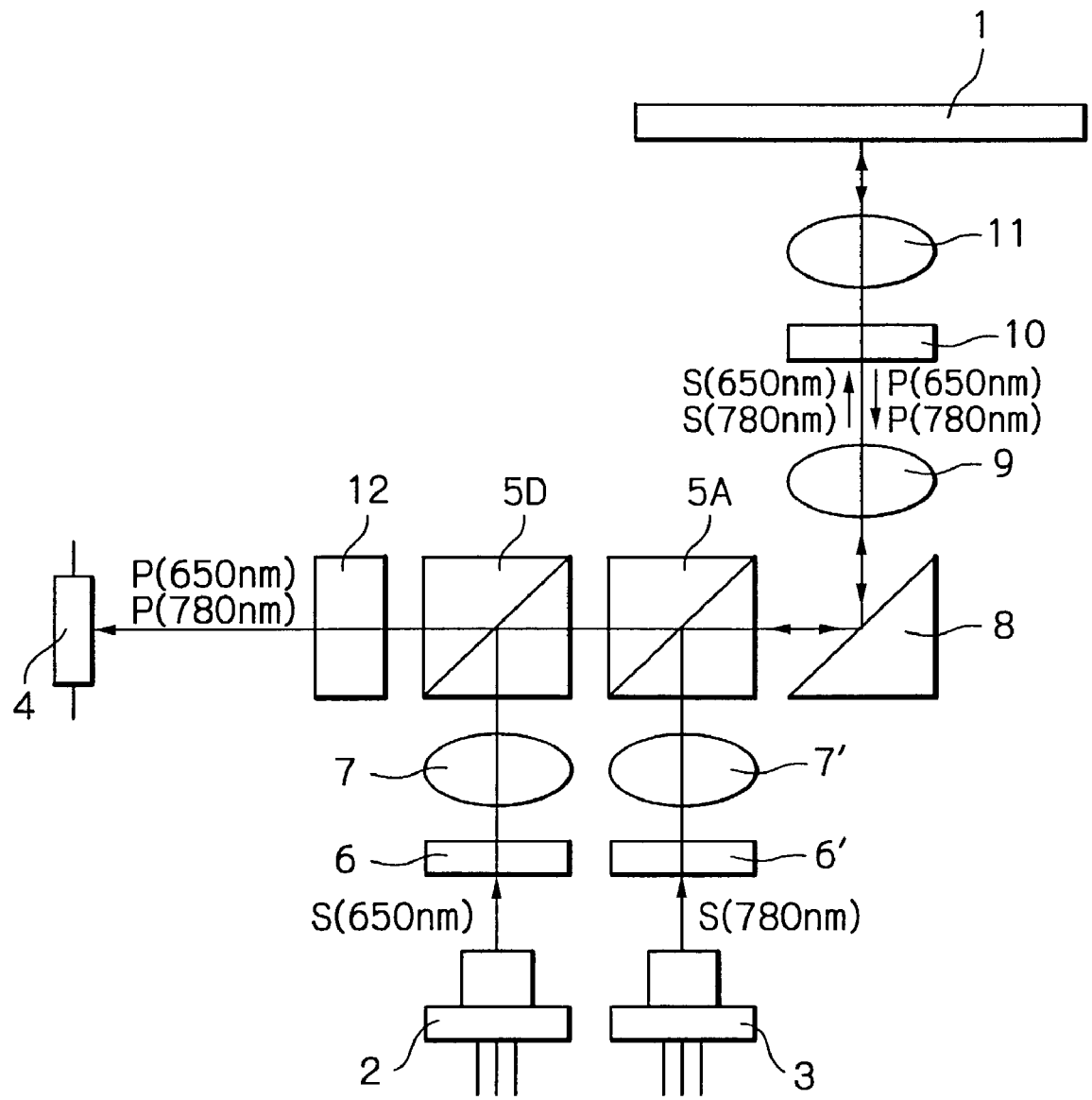

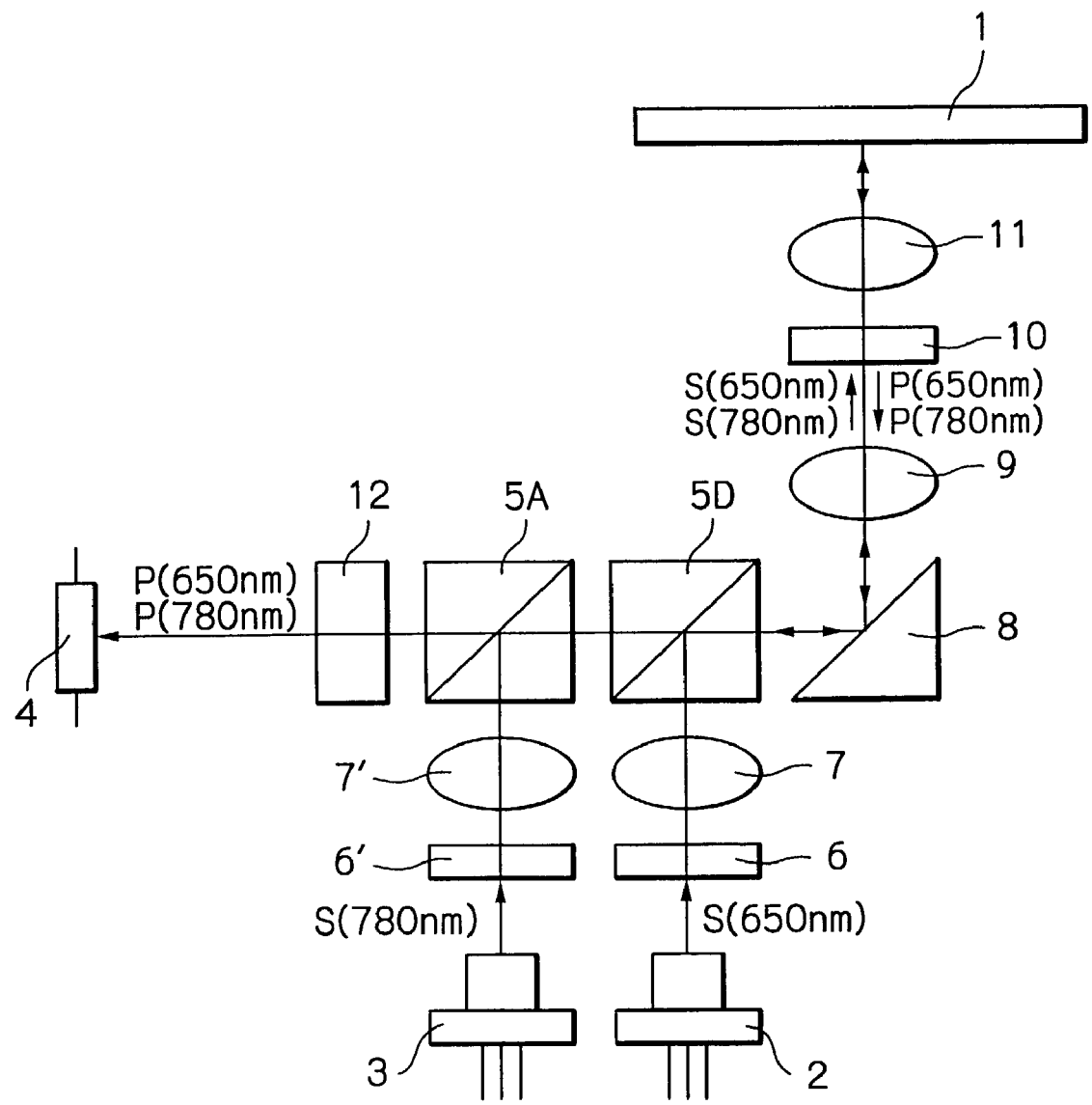

OPTICAL HEAD APPARATUS INCLUDING TWO LIGHT SOURCES AND ONE PHOTODETECTOR

BACKGROUND OF THE INVENTION

1. Field of the Invention

The present invention relates to an optical head apparatus for different types of disks such as a digital versatile disk (DVD) and a compact disk (CD).

2. Description of the Related Art

Recently, optical head apparatuses have been developed to be adapted to a DVD and a CD. In this case, a DVD requires a 650 nm wavelength light source, while a CD requires a 780 nm wavelength light source. Therefore, one of such optical head apparatuses is constructed by two light sources for emitting two kinds of light beams, i.e., a 650 nm wavelength light beam and a 780 nm wavelength light beam and transmitting them to a disk and one photodetector for receiving a light beam reflected from the disk.

In a first prior art optical head apparatus (see: JP-A-10-112050), first and second beam splitters for receiving a 650 nm wavelength light beam and a 780 nm wavelength light beam, respectively, are provided between a photodetector and an objective lens. The first beam splitter transmits half of the 650 nm wavelength light beam and most of the 780 nm wavelength light beam therethrough, while the first beam splitter reflects half of the 650 nm wavelength light beam and a small part of the 780 nm wavelength light beam. Also, a second beam splitter transmits most of the 650 nm wavelength light beam and half of the 780 nm wavelength light beam, while the second beam splitter reflects a small part of the 650 nm wavelength light beam and half of the 780 nm wavelength light beam. This will be explained later in detail.

In the above-described first prior art optical head apparatus, however, since losses of the intensity of the outgoing and incoming 650 nm wavelength light beams occur in the first beam splitter and also, losses of the intensity of the outgoing and incoming 780 nm wavelength light beams occur in the second beam splitter, the signal-to-noise (S/N) ratio would be decreased.

In a second prior art optical head apparatus (see: JP-A-10-228668), a wavelength selecting prism for selecting an S-polarized 650 nm wavelength light beam and an S-polarized 780 nm light beam is provided, and a beam splitter and a quarter-wave plate are provided between a photodetector and an objective lens. The beam splitter transmits most of the P-polarized components of the 650 nm wavelength light beam and the 780 nm wavelength light beam, while the beam splitter reflects most of the S-polarized components of the 650 nm wavelength light beam and the 780 nm wavelength light beam. This also will be explained later in detail.

In the above-described second prior art optical head apparatus, however, since losses of the intensity of the outgoing light beams occur in the wavelength selecting prism, the S/N ratio would be decreased. Additionally, since the difference in wavelength dependence characteristics between the P-polarized and S-polarized light beams cannot be large, it is difficult for the 650 nm wavelength light beam and the 780 nm wavelength light beam to be within a range of the polarizing beam splitter characteristics. Therefore, since the manufacturing margin of the beam splitter is small, the manufacturing cost would be increased.

SUMMARY OF THE INVENTION

It is an object of the present invention to provide an optical head apparatus capable of increasing the S/N ratio and decreasing the manufacturing cost.

According to the present invention, in an optical head apparatus including a first light source for emitting a first light beam having a first wavelength, a second light source for emitting a second light beam having a second wavelength different from the first wavelength, an objective lens, a photodetector, and first and second optical combining/splitting elements, the first optical combining/splitting element receives the first light beam from the first light source to outgo most of the first light beam therefrom to the second optical combining/splitting element and receives the first and second light beams from the second optical combining/splitting element to outgo most of the first and second light beams therefrom to the photodetector. The second optical combining/splitting element receives the first light beam from the first optical combining/splitting element and the second light beam from the second light source to outgo most of the first and second light beams therefrom to the objective lens and receives the first and second light beams from the objective lens to outgo most of the first and second light beams therefrom to the first optical combining/splitting element.

BRIEF DESCRIPTION OF THE DRAWINGS

The present invention will be more clearly understood from the description set forth below, as compared with the prior art, with reference to the accompanying drawings, wherein:

FIG. 4 is a graph showing transmittivity characteristics of a typical beam splitter;

FIGS. 5A, 5B, 5C and 5D are graphs showing transmittivity characteristics of beam splitters according to the present invention;

FIG. 6 is a diagram illustrating a first embodiment of the optical head apparatus according to the present invention;

FIG. 7 is a diagram illustrating a modification of the optical head apparatus of FIG. 6;

DESCRIPTION OF THE PREFERRED EMBODIMENTS

Before the description of the preferred embodiments, prior art optical head apparatuses will be explained with reference to FIGS. 1, 2 and 3.

Figure 1:
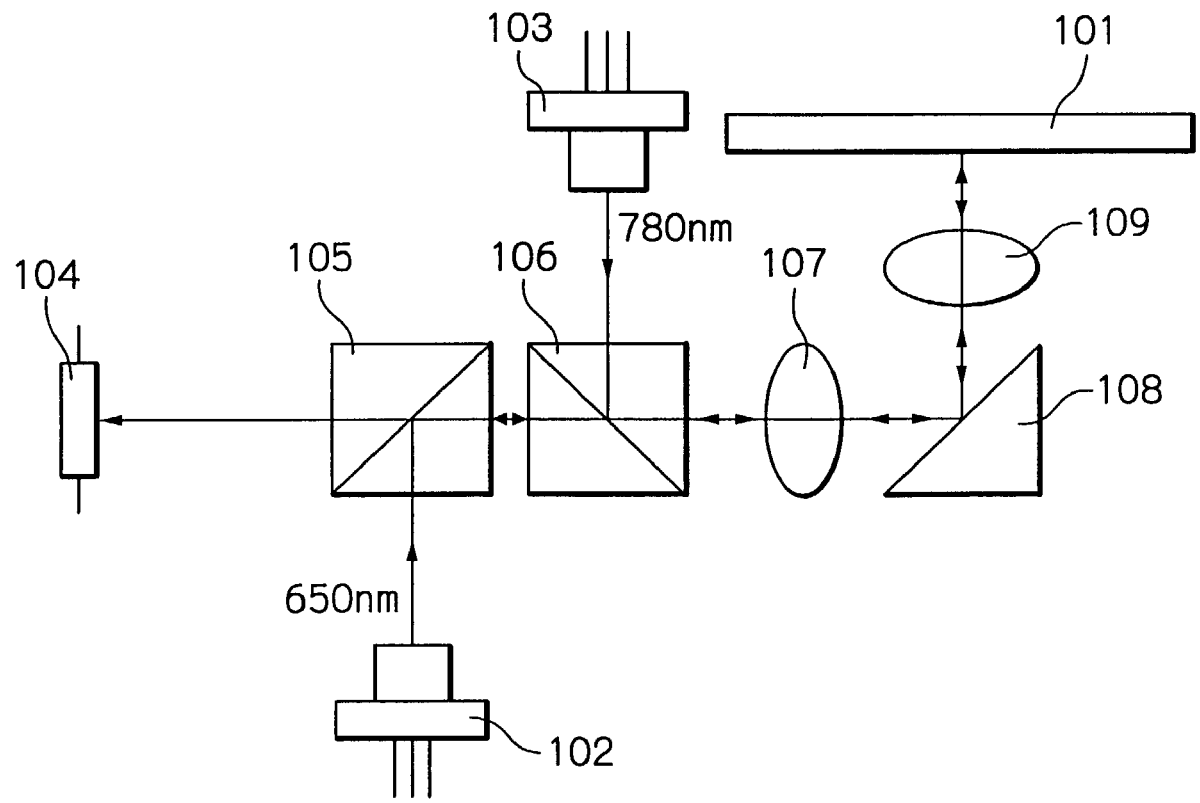
FIG. 1 is a diagram illustrating a first prior art optical head apparatus.

In FIG. 1, which illustrates a first prior art optical head apparatus (see: JP-A-10-112056), reference numeral 101 designates a disk which is either a DVD or a CD. That is, the DVD or the CD is mounted on the apparatus. A laser diode 102 generates a 650 nm wavelength light beam for the DVD, while a laser diode 103 generates a 780 nm wavelength light beam for the CD. A photodetector 104 receives a light beam reflected from the disk 101.

A beam splitter 105 passes half of the 650 nm wavelength light beam and most of the 780 nm wavelength light beam therethrough, while the beam splitter 105 reflects half of the 650 nm wavelength light beam and a small part of the 780 nm wavelength light beam.

A beam splitter 106 passes most of the 650 nm wavelength light beam and half of the 780 nm wavelength light beam therethrough, while the beam splitter 106 reflects a small part of the 650 nm wavelength light beam and half of the 780 nm wavelength light beam.

The 650 nm wavelength light beam generated from the laser diode 102 is half-reflected by the beam splitter 105, and passes through beam splitter 106 to reach a collimator lens 107 for converting the light beam passed therethrough into a collimated light beam. The collimated light beam is reflected by a mirror 108 and is focussed by an objective lens 109 at the disk 101 which is, in this case, a DVD.

A light beam reflected by the disk 101 is returned by the objective lens 109, the mirror 108, the collimator lens 107 and the beam splitters 106 and 105 to the photodetector 104. In this case, only the half of the 650 nm wavelength light beam passes through beam splitter 105.

On the other hand, the 780 nm wavelength light beam generated from the laser diode 103 is half-reflected by the beam splitter 106 to reach the collimator lens 107 for converting the light beam passed therethrough into a collimated light beam is reflected by the mirror 108 and is focussed by the objective lens 109 at the disk 101 which is, in this case, a CD.

A light beam reflected by the disk 101 is returned by the objective lens 109, the mirror 108, the collimator lens 107 and the beam splitters 106 and 105 to the photodetector 104. In this case, only half of the 780 nm wavelength light beam passes through beam splitter 106.

In the optical head apparatus of FIG. 1, however, since losses of the intensity of the outgoing and incoming 650 nm wavelength light beams occur in the beam splitter 105 and also, losses of the intensity of the outgoing and incoming 780 nm wavelength light beams occur in the beam splitter 106, the S/N ratio would be decreased.

Figure 2:
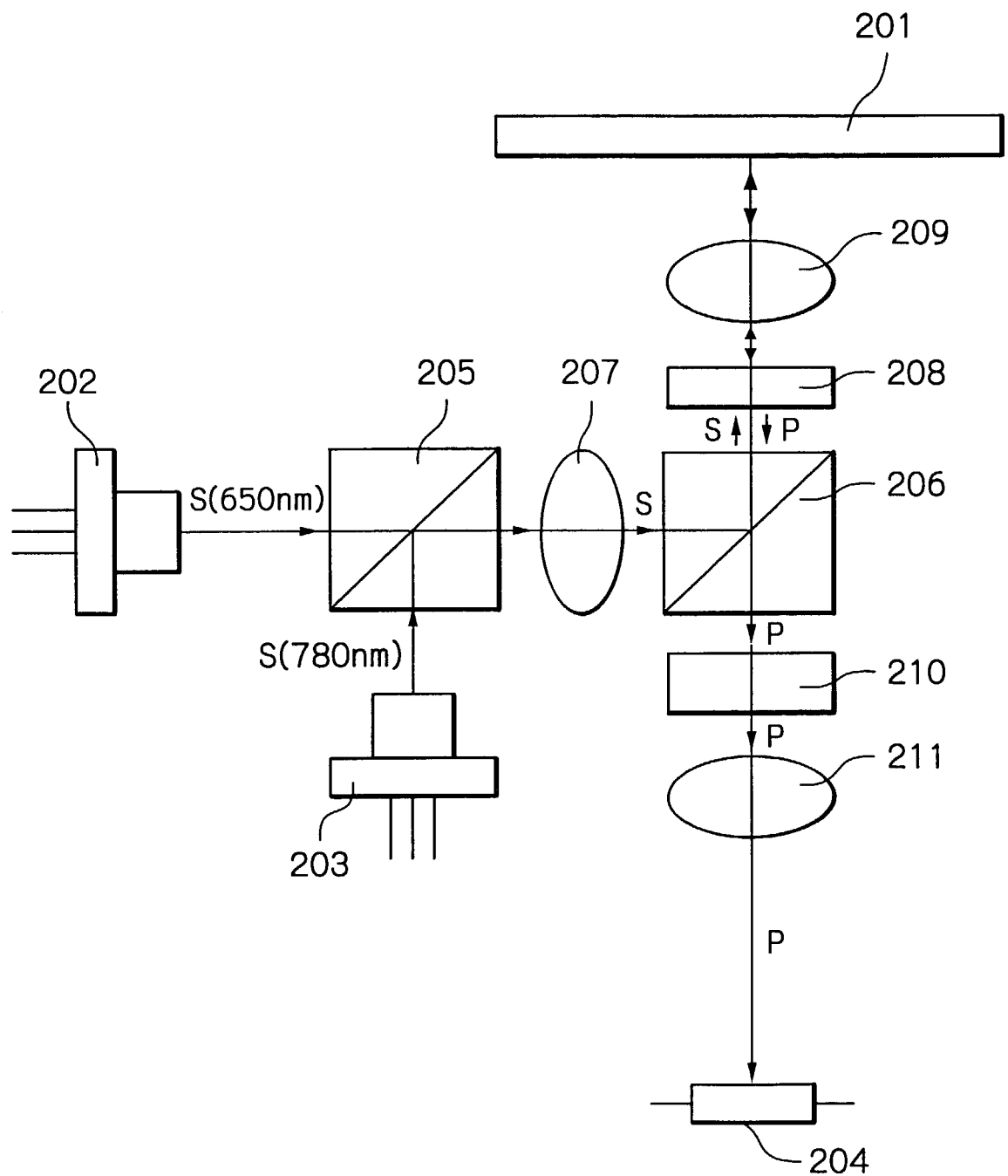
FIG. 2 is a diagram illustrating a second prior art optical head apparatus.
Figure 3:
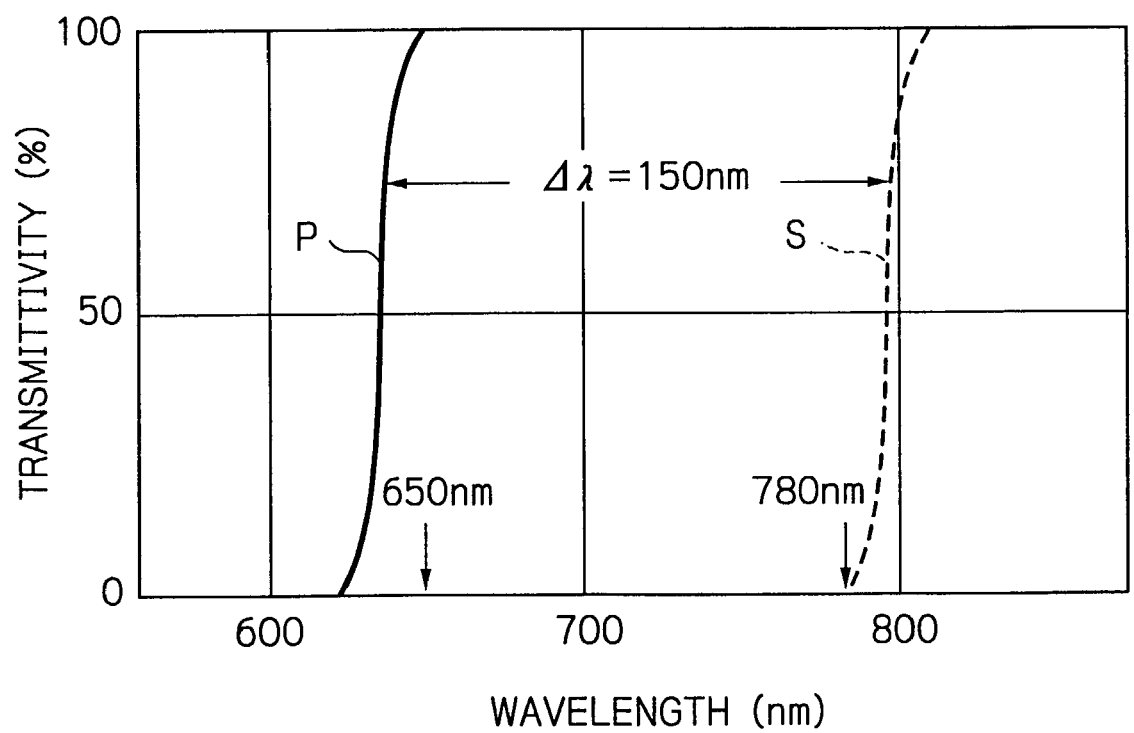
FIG. 3 is a graph showing the transmittivity characteristics of the beam splitter of FIG. 2.

In FIG. 2, which illustrates a second prior art optical head apparatus (see: JP-A-10-228668), reference numeral 201 designates a disk which is either a DVD or a CD. That is, the DVD or the CD is mounted on the apparatus. A laser diode 202 generates a 650 nm wavelength light beam for the DVD, while a laser diode 203 generates a 780 nm wavelength light beam for the CD. A photodetector 204 receives a light beam reflected from the disk 201.

A wavelength selecting prism 205 transmits most of the 650 nm light beam therethrough, and reflects most of the 780 nm light beam thereby.

A beam splitter 206 transmits most of P-polarized components of the 650 nm wavelength light beam and the 780 nm wavelength light beam, while the beam splitter 206 reflects most of S-polarized components of the 650 nm wavelength light beam and the 780 nm wavelength light beam. Transmittivity characteristics of the beam splitter 206 are shown in FIG. 3.

The S-polarized 650 nm wavelength light beam generated from the laser diode 202 is transmitted through the wavelength selecting prism 205 to reach a collimator lens 207 for converting the light beam passed therethrough into a collimated light beam. The collimated light beam is reflected by the beam splitter 206 due to the S-polarized light beam. Then, the light beam passes through a quarter-wave plate 208 so that the light beam is converted from a linearly-polarized (S-polarized) light mode into a circularly-polarized light mode, and then, is focussed by an objective lens 209 at the disk 201 which is, in this case, a DVD.

A light beam reflected by the disk 201 is returned by the objective lens 209 to the quarter-wave plate 208 and reaches the beam splitter 206. In this case, the light beam is P-polarized due to the presence of the quarter-wave plate 208 for converting the mode from a circularly-polarized light mode into a linearly-polarized (P-polarized) light mode. Therefore, the light beam transmitted through the beam splitter 206 passes through a cylindrical lens 210 and a convex lens 211 to reach the photodetector 204.

On the other hand, the S-polarized 780 nm wavelength light beam generated from the laser diode 203 is reflected by the wavelength selecting prism 205 to reach the collimator lens 207 for converting the light beam passed therethrough into a collimated light beam. The collimated light beam is reflected by the beam splitter 206 due to the S-polarized light beam. Then, the light beam passes through the quarter-wave plate 208 so that the light beam is converted from a linearly-polarized (S-polarized) light mode into a circularly-polarized light mode, and then, is focussed by an objective lens 209 at the disk 201 which is, in this case, a CD.

A light beam reflected by the disk 201 is returned by the objective lens 209 to the quarter-wave plate 208 and reaches the beam splitter 206. In this case, the light beam is P-polarized due to the presence of the quarter-wave plate 208 for converting the mode from a circularly-polarized light mode into a linearly-polarized (P-polarized) light mode. Therefore, the light beam transmitted by the beam splitter 206 passes through cylindrical lens 210 and the convex lens 211 to reach the photodetector 204.

In the optical head apparatus of FIG. 2, however, since losses of the intensity of the outgoing light beams occur in the wavelength selecting prism 205, the S/N ratio would be decreased. Additionally, as shown in FIG. 3, since the difference $\Delta\lambda$ in wavelength between the P-polarized and S-polarized characteristics cannot be large, for example, $\Delta\lambda=150$ nm, it is difficult for the 650 nm wavelength light beam and the 780 nm wavelength light beam to be within a range between the P-polarized and S-polarized characteristics. Therefore, since the manufacturing margin of the beam splitter 206 is small, the manufacturing cost would be increased. For example, if the P-polarized characteristics are shifted on the increase side, the P-polarized component of the 650 nm wavelength light beam is reflected by the beam splitter 206, so that the S/N ratio of the DVD would be decreased. On the other hand, if the S-polarized characteristics are shifted on the decrease side, the S-polarized component of the 780 nm wavelength light beam is transmitted through the beam splitter 206, so that the S/N ratio of the CD would be decreased.

Next, the principle of beam splitters according to the present invention will be explained with reference to FIGS. 4, 5A, 5B, 5C and 5D.

In FIG. 4, which shows transmittivity characteristics of a beam splitter 5, the beam splitter 5 transmits a part of an incident light beam I as a transmission light beam T and reflects a part of the incident light beam I as a reflected light beam R. Generally, the transmittivity characteristics of a P-polarized component of the incident light beam I are different from those of an S-polarized component of the incident light beam I. That is, there are generally five regions R1, R2, R3, R4 and R5. In the regions R1 and R5, the transmittivity of the P-polarized component is almost 100% (more than 90%) and also, the transmittivity of the S-polarized component is almost 100% (more than 90%). In the regions R2 and R4, the transmittivity of the P-polarized component is almost 100% (more than 90%) and also, the transmittivity of the S-polarized component is almost 0% (less than 10%). In the region R3, the transmittivity of the P-polarized component is almost 0% (less than 10%) and also, the transmittivity of the S-polarized component is almost 0% (less than 10%).

Note that the transmittivity characteristics of the beam splitter 5 can be adjusted by changing the number and thickness of dielectric layers sandwiched by two transparent substrates.

According to the present invention, the 650 nm wavelength light beam falls into one of the regions R1, R2, ..., R5 and the 780 nm wavelength light beam falls into another of those regions. Therefore, since the manufacturing margin of beam splitters can be large, the manufacturing cost thereof would be decreased.

Figure 5A:
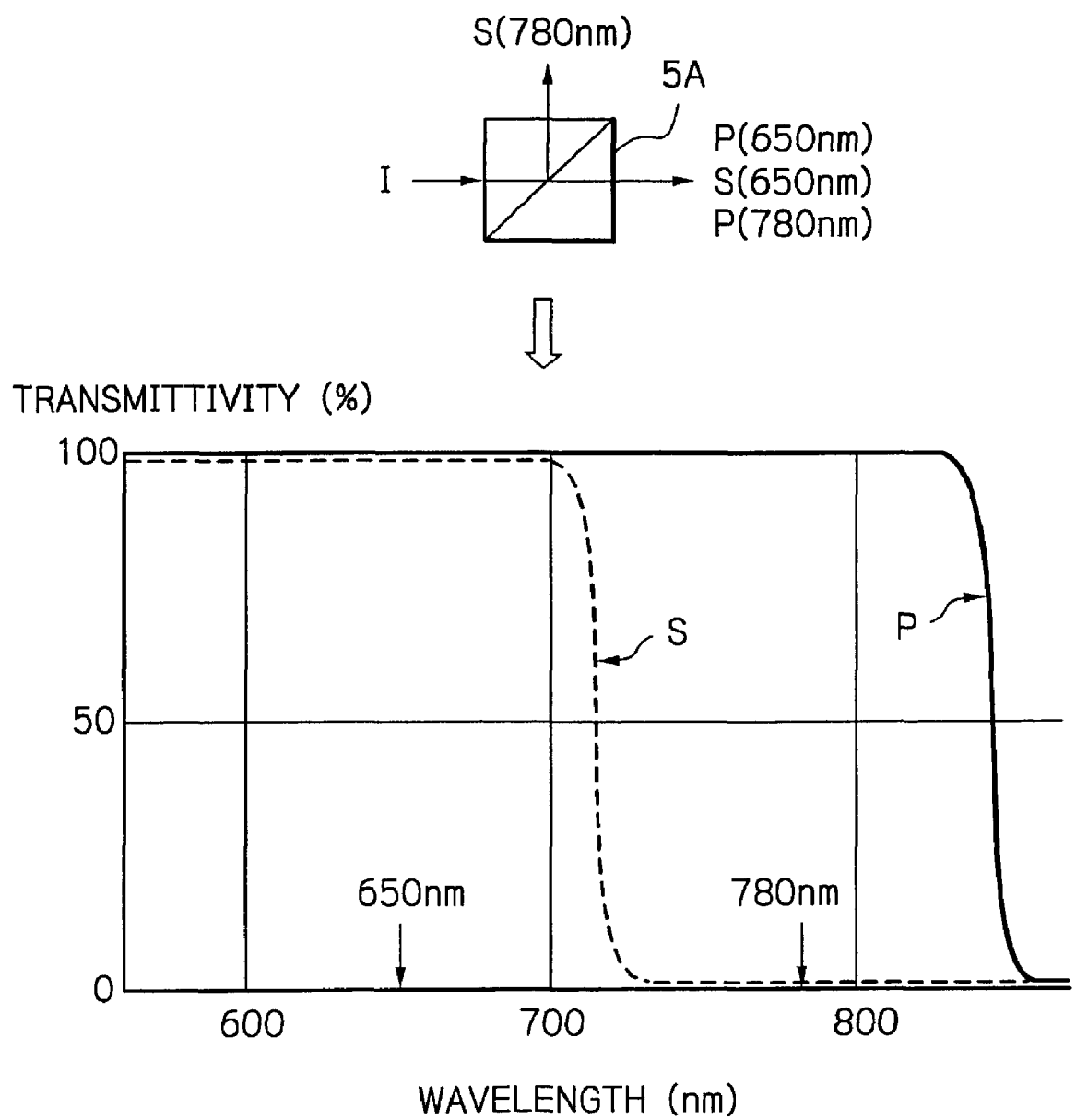

When the 650 nm wavelength light beam falls into the region R1 of FIG. 4 and the 780 nm wavelength light beam falls into the region R2 of FIG. 4, a beam splitter 5A as illustrated in FIG. 5A is obtained. That is, the beam splitter 5A transmits most of the P-polarized and S-polarized components of the 650 nm wavelength light beam and the P-polarized component of the 780 nm wavelength light beam, and reflects most of the S-polarized component of the 780 nm wavelength light beam.

When the 650 nm wavelength light beam falls into the region R2 of FIG. 4 and the 780 nm wavelength light beam falls into the region R3 of FIG. 4, a beam splitter 5B as illustrated in FIG. 5B is obtained. That is, the beam splitter 5B transmits most of the P-polarized component of the 650 nm wavelength light beam, and reflects most of the S-polarized component of the 650 nm wavelength light beam and the P-polarized and S-polarized components of the 780 nm wavelength light beam.

When the 650 nm wavelength light beam falls into the region R3 of FIG. 4 and the 780 nm wavelength light beam falls into the region R4 of FIG. 4, a beam splitter 5C as illustrated in FIG. 5C is obtained. That is, the beam splitter 5C transmits most of the P-polarized component of the 780 nm wavelength light beam, and reflects most of the P-polarized and S-polarized components of the 650 nm wavelength light beam and the S-polarized component of the 780 nm wavelength light beam.

Figure 5D:
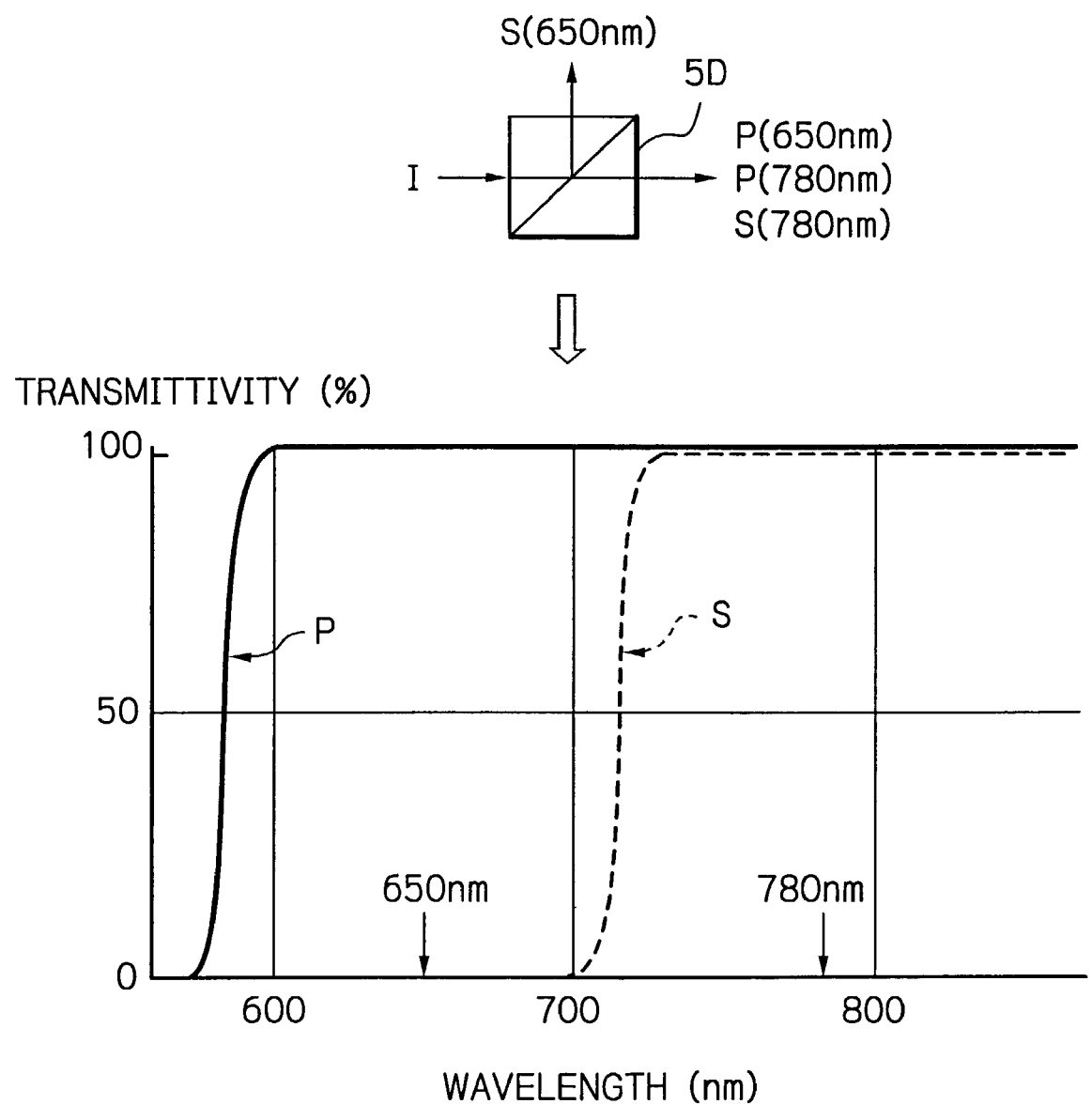

When the 650 nm wavelength light beam falls into the region R4 of FIG. 4 and the 780 nm wavelength light beam falls into the region R5 of FIG. 4, a beam splitter 5D as illustrated in FIG. 5D is obtained. That is, the beam splitter 5D transmits most of the P-polarized component of the 650 nm wavelength light beam and the P-polarized and S-polarized components of the 780 nm wavelength light beam, and reflects most of the S-polarized component of the 650 nm wavelength light beam.

In FIG. 6, which illustrates a first embodiment of the optical head apparatus according to the present invention, reference numeral 1 designates a disk which is a DVD or a CD. That is, the DVD or the CD is mounted on the apparatus. A laser diode 2 generates an S-polarized 650 nm wavelength light beam for the DVD, while a laser diode 3 generates an S-polarized 780 nm wavelength light beam for the CD. A photodetector 4 receives a light beam reflected from the disk 1.

Provided between the photodetector 4 and the disk 1 are the beam splitter 5D having the transmittivity characteristics of FIG. 5D and the beam splitter 5A having the transmittivity characteristics of FIG. 5A. In this case, a light beam reflected from the disk 1 is transmitted through the beam splitters 5A and 5D to reach the photodetector 4.

The S-polarized 650 nm wavelength light beam generated from the laser diode 2 is divided by a diffraction grating 6 into a zeroth order light component (transmission light component), a +1st order diffraction light component and a −1st order diffraction light component, which are converged by a coupling lens 7. Most of the converged light beam of the coupling lens 7 is reflected by the beam splitter 5D and is transmitted through the beam splitter 5A. Then, the light beam transmitted through beam splitter 5A is reflected by a mirror 8 to reach a collimator lens 9 for converting the light beam passed therethrough into a collimated light beam. The collimated light beam is converted by a quarter-wave plate 10 from a linearly-polarized (S-polarized) light mode into a circularly-polarized light mode, and then, is focussed by an objective lens 11 at the disk 1 which is, in this case, a DVD.

The light beam reflected by the disk 1 is returned by the objective lens 11 to the quarter-wave plate 10. As a result, the mode of the light beam is converted from the circularly-polarized light mode into a linearly-polarized (P-polarized) light mode. Then, the P-polarized light beam is reflected by the mirror 8 and is transmitted through the beam splitters 5A and 5D, and further passes through the compound lens 12 to reach the photodetector 4.

Note that the compound lens 12 has a cylindrical surface for incident light and a concave surface for outgoing light. Also, the photodetector 4 is positioned at an intermediate location between the two focal lines of the compound lens 12.

On the other hand, the S-polarized 780 nm wavelength light beam generated from the laser diode 3 is divided by a diffraction grating 6' into a zeroth order light component (transmission light component), a +1st order diffraction light component and a −1st order diffraction light component, which are converged by a coupling lens 7'. Most of the converged light beam of the coupling lens 7' is reflected by the beam splitter 5A. Then, the light beam reflected by the beam splitter 5A is reflected by the mirror 8 to reach the collimator lens 9 for converting the light beam passed therethrough into a collimated light beam. The collimated light beam is converted by the quarter-wave plate 10 from a linearly-polarized (S-polarized) light mode into a circularly-polarized light mode, and then, is focussed by the objective lens 11 at the disk 1 which is, in this case, a CD.

The light beam reflected by the disk 1 is returned by the objective lens 11 to the quarter-wave plate 10. As a result, the mode of the light beam is converted from the circularly-polarized light mode into a linearly-polarized (P-polarized) light mode. Then, the P-polarized light beam is reflected by the mirror 8 and is transmitted through the beam splitters 5A and 5D, and further passes through compound lens 12 to reach the photodetector 4.

In the optical head apparatus of FIG. 6, since losses of the intensity of the outgoing and incoming light beams hardly occur in the beam splitters 5D and 5A, the S/N ratio would be increased. Additionally, as stated above, the manufacturing margin of the beam splitters 5D and 5A is large, so that the manufacturing cost thereof can be decreased.

In FIG. 7, which illustrates a modification of the optical head apparatus of FIG. 6, the locations of the laser diode 2, the diffraction grating 6, the coupling lens 7 and the beam splitter 5D of FIG. 6 are exchanged with the locations of the laser diode 3, the diffraction grating 6', the coupling lens 7' and the beam splitter 5A, respectively, of FIG. 6. The operation of the optical head apparatus of FIG. 7 is similar to that of the optical head apparatus of FIG. 6.

Figure 8:
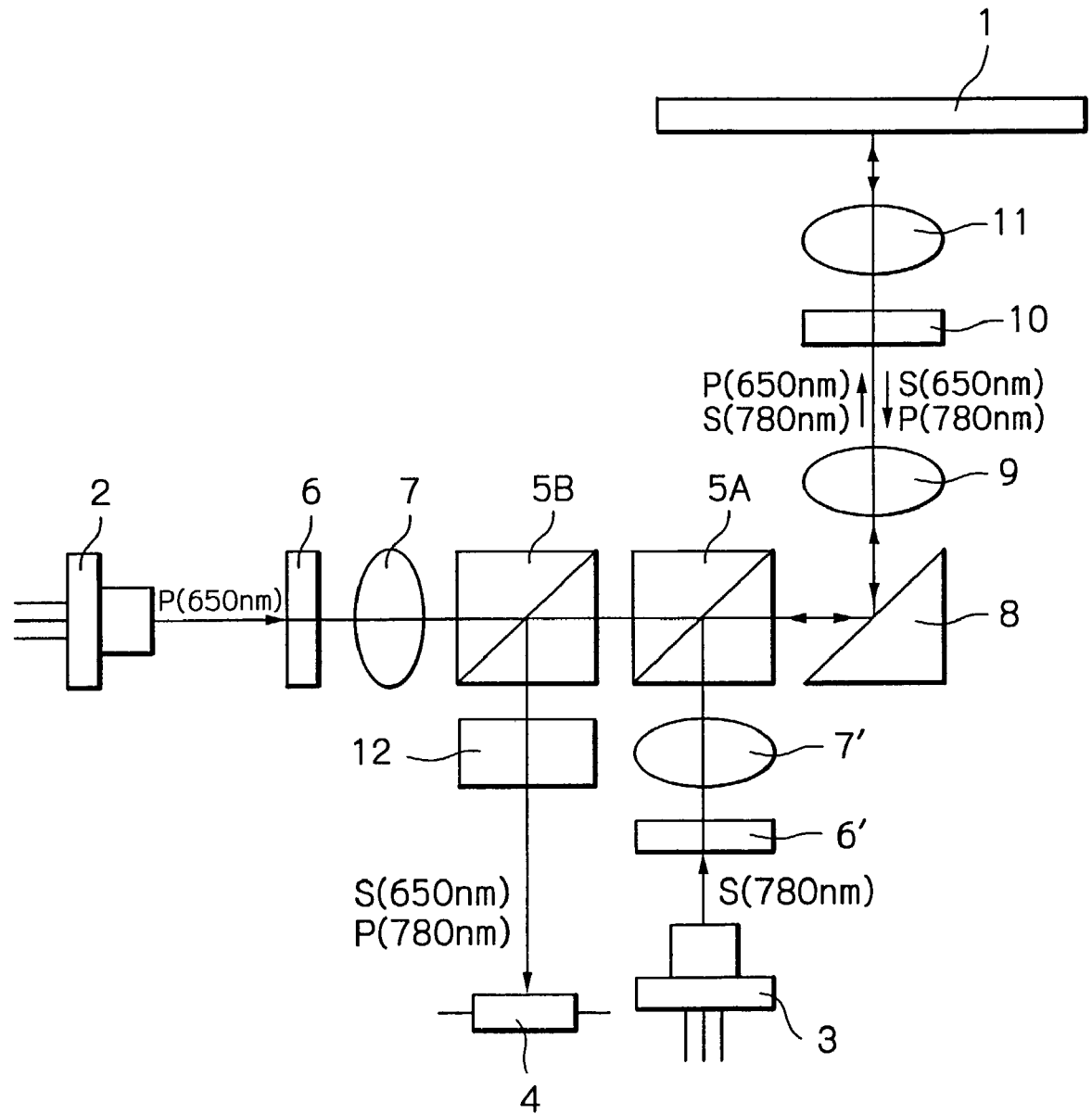
FIG. 8 is a diagram illustrating a second embodiment of the optical head apparatus according to the present invention.

In FIG. 8, which illustrates a second embodiment of the optical head apparatus according to the present invention, the laser diode 2 generates a P-polarized 650 nm wavelength light beam for the DVD, while the laser diode 3 generates an S-polarized 780 nm wavelength light beam for the CD.

The beam splitter 5B having the transmittivity characteristics of FIG. 5B and the beam splitter 5A having the transmittivity characteristics of FIG. 5A are provided between the photodetector 4 and the disk 1. In this case, a light beam reflected from the disk 1 is transmitted through the beam splitter 5A and is reflected by the beam splitter 5B to reach the photodetector 4.

The P-polarized 650 nm wavelength light beam generated from the laser diode 2 is divided by the diffraction grating 6 into a zeroth order light component (transmission light component), a +1st order diffraction light component and a −1st order diffraction light component, which are converged by the coupling lens 7. Most of the converged light beam of the coupling lens 7 is transmitted through the beam splitters 5B and 5A. Then, the light beam transmitted through the beam splitter 5A is reflected by the mirror 8 to reach the collimator lens 9 for converting the light beam passed therethrough into a collimated light beam. The collimated light beam is converted by the quarter-wave plate 10 from a linearly-polarized (P-polarized) light mode into a circularly-polarized light mode, and then, is focussed by the objective lens 11 at the disk 1 which is, in this case, a DVD.

The light beam reflected by the disk 1 is returned by the objective lens 11 to the quarter-wave plate 10. As a result, the mode of the light beam is converted from the circularly-polarized light mode into a linearly-polarized (S-polarized) light mode. Then, the S-polarized light beam is reflected by the mirror 8 and is transmitted through the beam splitter 5A. Then, the light beam transmitted through the beam splitter 5A is reflected by the splitter 5B and passes through the beam splitter 5B, and further passes through the compound lens 12 to reach the photodetector 4.

On the other hand, the S-polarized 780 nm wavelength light beam generated from the laser diode 3 is divided by the diffraction grating 6' into a zeroth order light component (transmission light component), a +1st order diffraction light component and a −1st order diffraction light component, which are converged by the coupling lens 7'. Most of the converged light beam of the coupling lens 7' is reflected by the beam splitter 5A. Then, the light beam reflected by the beam splitter 5A is reflected by the mirror 8 to reach the collimator lens 9 for converting the light beam passed therethrough into a collimated light beam. The collimated light beam is converted by the quarter-wave plate 10 from a linearly-polarized (S-polarized) light mode into a circularly-polarized light mode, and then, is focussed by the objective lens 11 at the disk 1 which is, in this case, a CD.

The light beam reflected by the disk 1 is returned by the objective lens 11 to the quarter-wave plate 10. As a result, the mode of the light beam is converted from the circularly-polarized light mode into a linearly-polarized (P-polarized) light mode. Then, the P-polarized light beam is reflected by the mirror 8 and is transmitted through the beam splitter 5A. Then, the light beam transmitted through the beam splitter 5A is reflected by the beam splitter 5B, and further passes through the compound lens 12 to reach the photodetector 4.

In the optical head apparatus of FIG. 8, since losses of the intensity of the outgoing and incoming light beams hardly occur in the beam splitters 5B and 5A, the S/N ratio would be increased. Additionally, as stated above, the manufacturing margin of the beam splitters 5B and 5A is large, so that the manufacturing cost thereof can be decreased.

Figure 9:
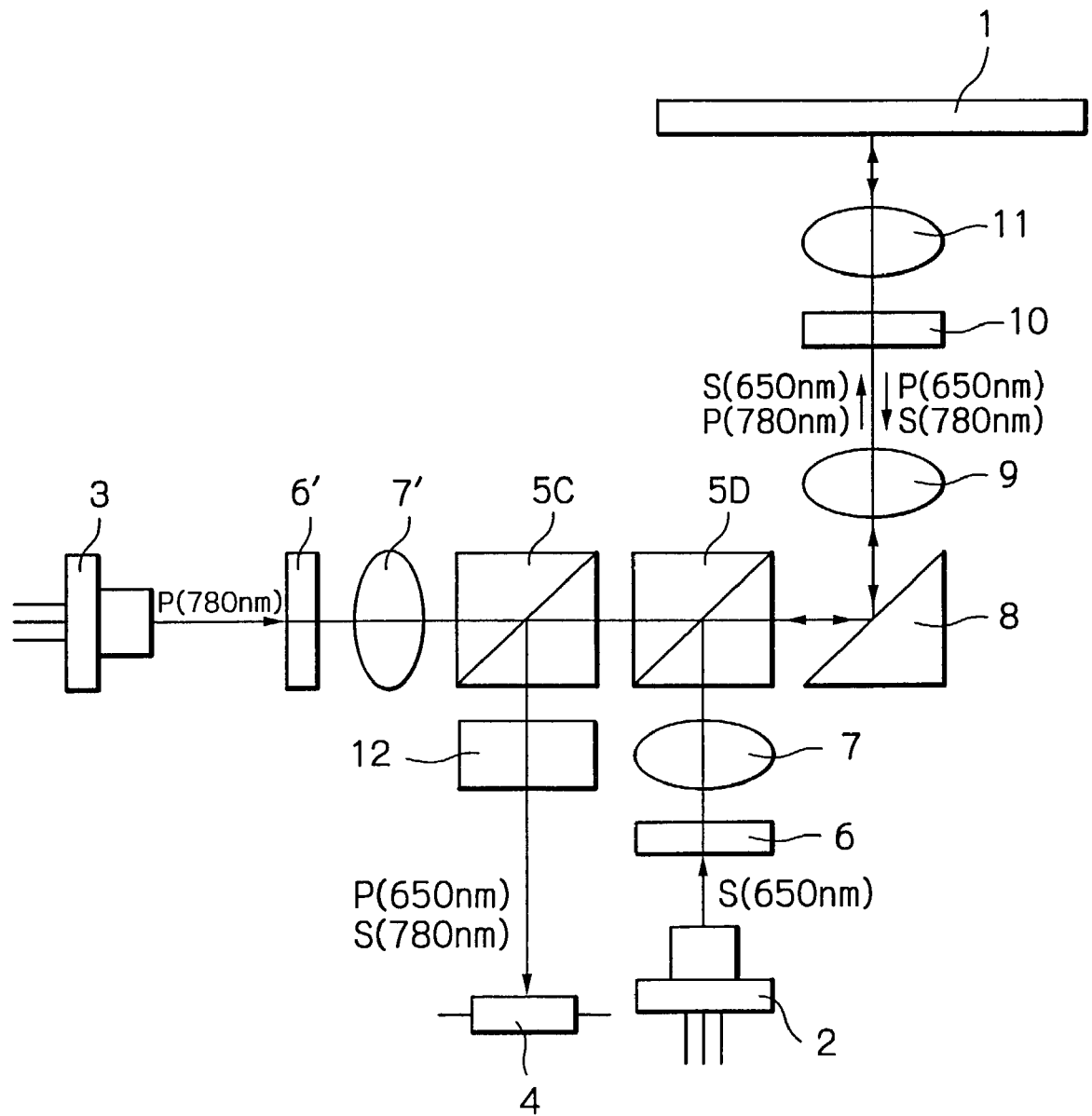
FIG. 9 is a diagram illustrating a modification of the optical head apparatus of FIG. 8.

In FIG. 9, which illustrates a modification of the optical head apparatus of FIG. 8, the locations of the laser diode 2, the diffraction grating 6 and the coupling lens 7 of FIG. 8 are exchanged with the locations of the laser diode 3, the diffraction grating 6' and the coupling lens 7', respectively, of FIG. 8. In this case, the laser diode 2 generates an S-polarized 650 nm wavelength light beam for the DVD, while the laser diode 3 generates a P-polarized 780 nm wavelength light beam for the CD. Also, the beam splitters 5B and 5A of FIG. 8 are replaced by the beam splitters 5C and 5D having the transmittivity characteristics of FIGS. 5C and 5D, respectively. The operation of the optical head apparatus of FIG. 9 is similar to that of the optical head apparatus of FIG. 8.

Figure 10:
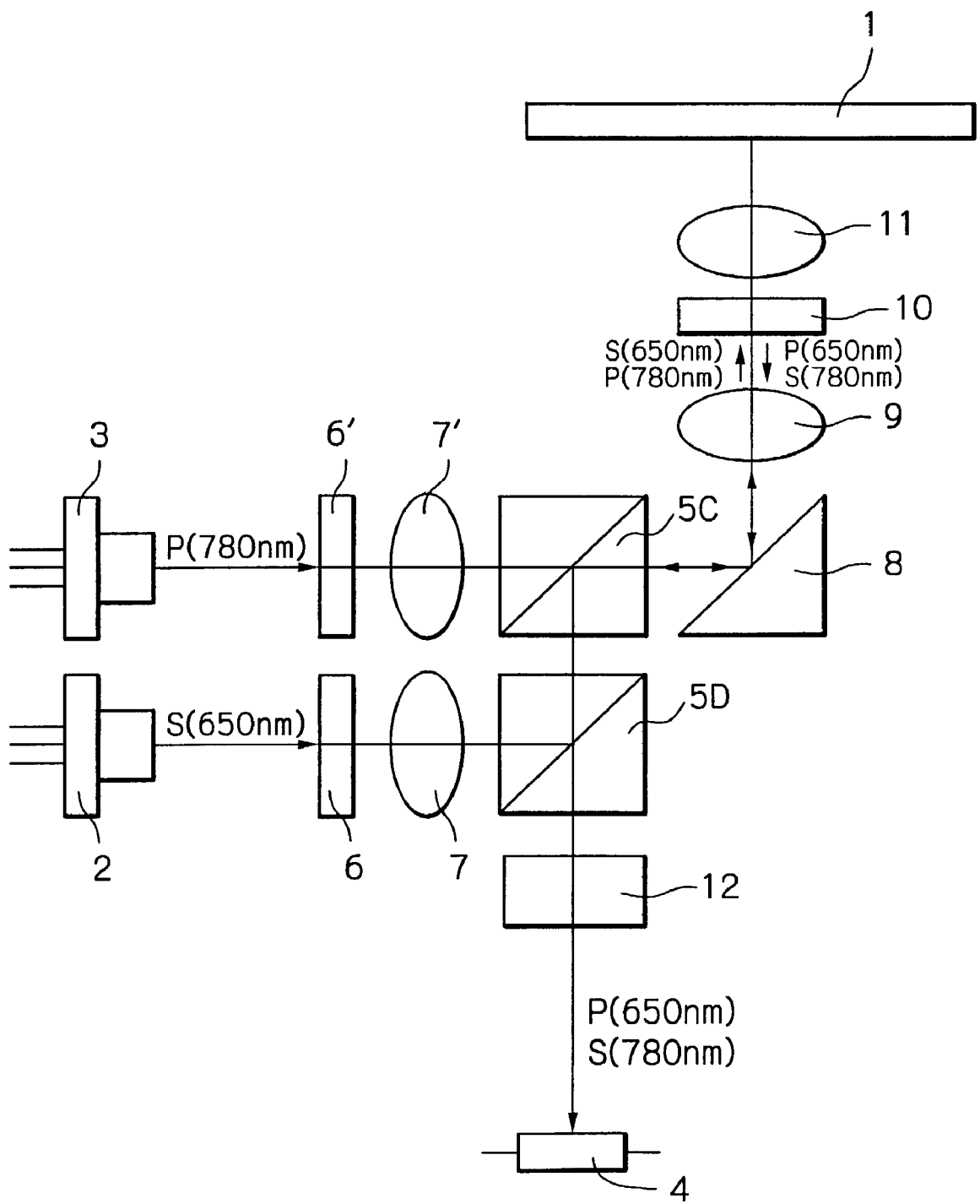
FIG. 10 is a diagram illustrating a third embodiment of the optical head apparatus according to the present invention.

In FIG. 10, which illustrates a third embodiment of the optical head apparatus according to the present invention, the laser diode 2 generates an S-polarized 650 nm wavelength light beam for the DVD, while the laser diode 3 generates a P-polarized 780 nm wavelength light beam for the CD.

The beam splitter 5D having the transmittivity characteristics of FIG. 5D and the beam splitter 5C having the transmittivity characteristics of FIG. 5C are provided between the photodetector 4 and the disk 1. In this case, a light beam reflected from the disk 1 is reflected by the beam splitter 5C and is transmitted through the beam splitter 5D to reach the photodetector 4.

The S-polarized 650 nm wavelength light beam generated from the laser diode 2 is divided by the diffraction grating 6 into a zeroth order light component (transmission light component), a +1st order diffraction light component and a −1st order diffraction light component, which are converged by the coupling lens 7. Most of the converged light beam of the coupling lens 7 is reflected by the beam splitters 5D and 5C. Then, the light beam reflected by the beam splitter 5C is reflected by the mirror 8 to reach the collimator lens 9 for converting the light beam passed therethrough into a collimated light beam. The collimated light beam is converted by the quarter-wave plate 10 from a linearly-polarized (S-polarized) light mode into a circularly-polarized light mode, and then, is focussed by the objective lens 11 at the disk 1 which is, in this case, a DVD.

The light beam reflected by the disk 1 is returned by the objective lens 11 to the quarter-wave plate 10. As a result, the mode of the light beam is converted from the circularly-polarized light mode into a linearly-polarized (P-polarized) light mode. Then, the P-polarized light beam is reflected by the mirror 8 and is reflected by the beam splitter 5C. Then, the light beam reflected by the beam splitter 5C is transmitted through the beam splitter 5D, and further passes through the compound lens 12 to reach the photodetector 4.

On the other hand, the P-polarized 780 nm wavelength light beam generated from the laser diode 3 is divided by the diffraction grating 6' into a zeroth order light component (transmission light component), a +1st order diffraction light component and a −1st order diffraction light component, which are converged by the coupling lens 7'. Most of the converged light beam of the coupling lens 7' is transmitted through the beam splitter 5C. Then, the light beam transmitted through the beam splitter 5C is reflected by the mirror 8 to reach the collimator lens 9 for converting the light beam passed therethrough into a collimated light beam. The collimated light beam is converted by the quarter-wave plate 10 from a linearly-polarized (P-polarized) light mode into a circularly-polarized light mode, and then, is focussed by the objective lens 11 at the disk 1 which is, in this case, a CD.

The light beam reflected by the disk 1 is returned by the objective lens 11 to the quarter-wave plate 10. As a result, the mode of the light beam is converted from the circularly-polarized light mode into a linearly-polarized (S-polarized) light mode. Then, the S-polarized light beam is reflected by the mirror 8 and is reflected by the beam splitter 5C. Then, the light beam reflected by the beam splitter 5C is transmitted through the beam splitter 5D, and further passes through the compound lens 12 to reach the photodetector 4.

In the optical head apparatus of FIG. 10, since losses of the intensity of the outgoing and incoming light beams hardly occur in the beam splitters 5D and 5C, the S/N ratio would be increased. Additionally, as stated above, the manufacturing margin of the beam splitters 5D and 5C is large, so that the manufacturing cost thereof can be decreased.

Figure 11:
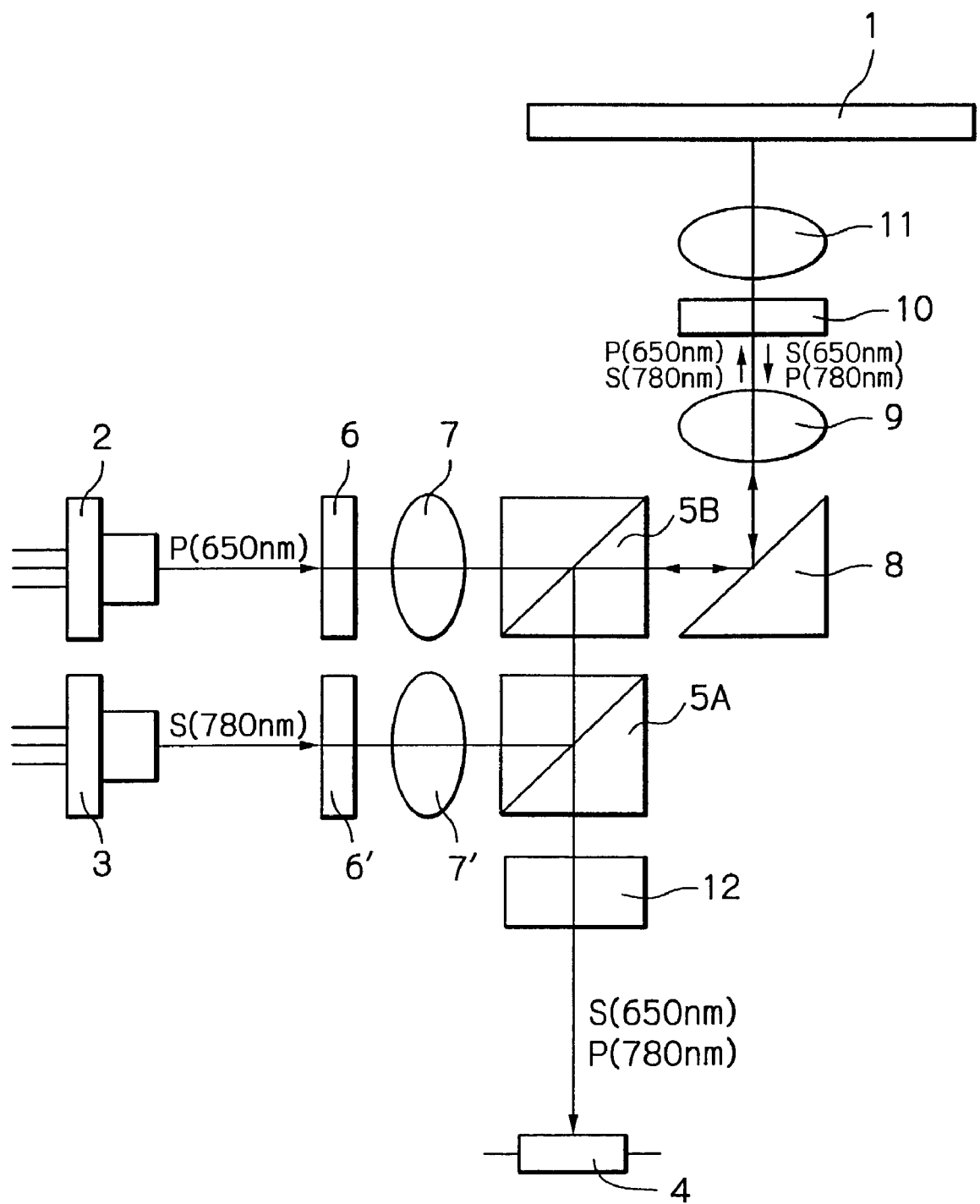
FIG. 11 is a diagram illustrating a modification of the optical head apparatus of FIG. 10.

In FIG. 11, which illustrates a modification of the optical head apparatus of FIG. 10, the locations of the laser diode 2, the diffraction grating 6 and the coupling lens 7 of FIG. 10 are exchanged with the locations of the laser diode 3, the diffraction grating 6' and the coupling lens 7', respectively, of FIG. 10. In this case, the laser diode 2 generates a P-polarized 650 nm wavelength beam for the DVD, while the laser diode 3 generates an S-polarized 780 nm wavelength light beam for the CD. Also, the beam splitters 5D and 5C of FIG. 10 are replaced by the beam splitters 5A and 5B having the transmittivity characteristics of FIGS. 5A and 5B, respectively. The operation of the optical head apparatus of FIG. 11 is similar to that of the optical head apparatus of FIG. 10.

Figure 12:
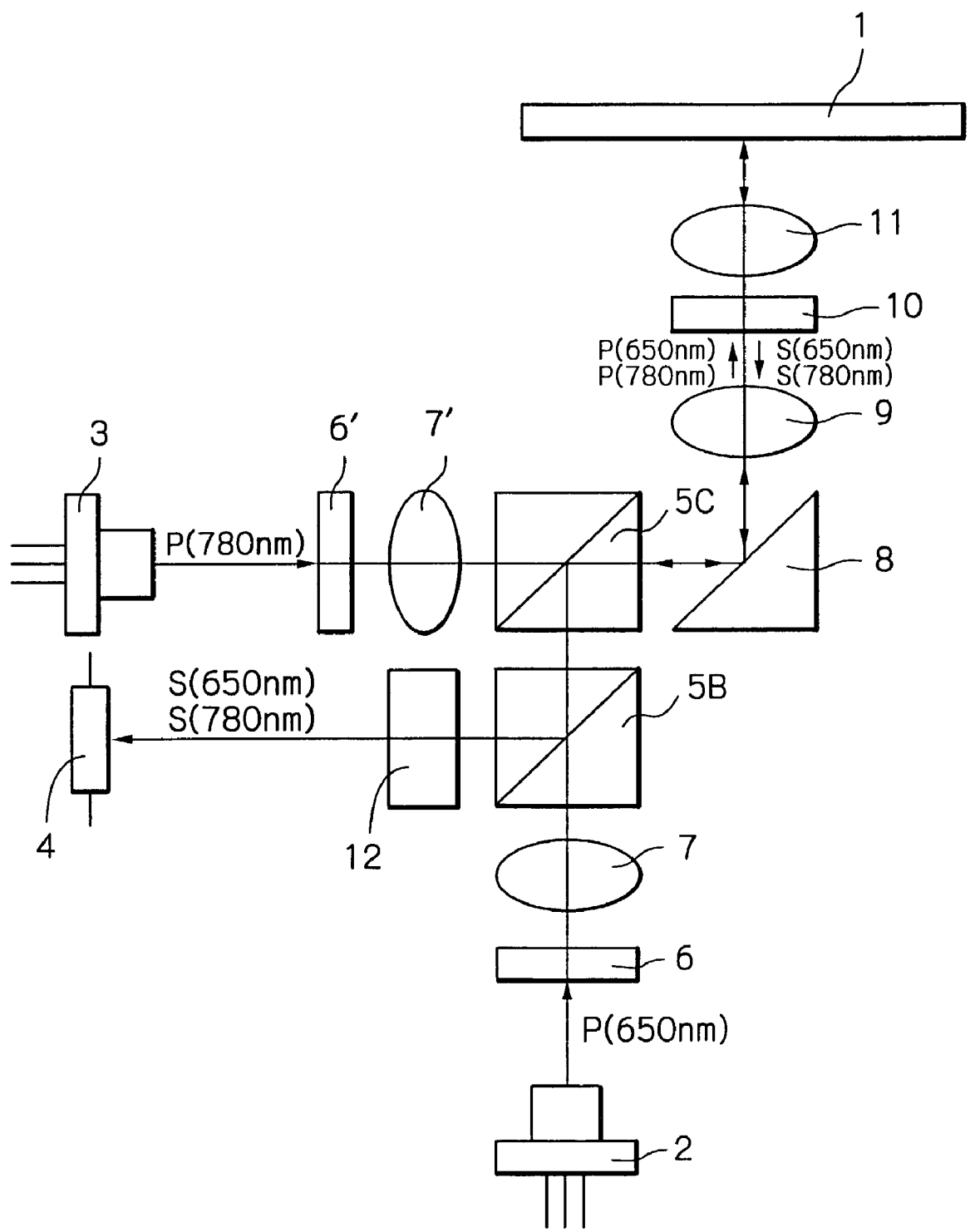
FIG. 12 is a diagram illustrating a fourth embodiment of the optical head apparatus according to the present invention.

In FIG. 12, which illustrates a fourth embodiment of the optical head apparatus according to the present invention, the laser diode 2 generates a P-polarized 650 nm wavelength light beam for a DVD, while the laser diode 3 generates a P-polarized 780 nm wavelength light beam for a CD.

The beam splitter 5B having the transmittivity characteristics of FIG. 5B and the beam splitter 5C having the transmittivity characteristics of FIG. 5C are provided between the photodetector 4 and the disk 1. In this case, a light beam reflected from the disk 1 is reflected by the beam splitters 5C and 5B to reach the photodetector 4.

The P-polarized 650 nm wavelength light beam generated from the laser diode 2 is divided by the diffraction grating 6 into a zeroth order light component (transmission light component), a +1st order diffraction light component and a −1st order diffraction light component, which are converged by the coupling lens 7. Most of the converged light beam of the coupling lens 7 is transmitted through the beam splitter 5B and is reflected by the beam splitter 5C. Then, the light beam reflected by the beam splitter 5C is reflected by the mirror 8 to reach the collimator lens 9 for converting the light beam passed therethrough into a collimated light beam. The collimated light beam is converted by the quarter-wave plate 10 from a linearly-polarized (P-polarized) light mode into a circularly-polarized light mode, and then, is focussed by the objective lens 11 at the disk 1 which is, in this case, a DVD.

The light beam reflected by the disk 1 is returned by the objective lens 11 to the quarter-wave plate 10. As a result, the mode of the light beam is converted from the circularly-polarized light mode into a linearly-polarized (S-polarized) light mode. Then, the S-polarized light beam is reflected by the mirror 8 and is reflected by the beam splitter 5C. Then, the light beam reflected by the beam splitter 5C is transmitted through the beam splitter 5B, and further passes through the compound lens 12 to reach the photodetector 4.

On the other hand, the P-polarized 780 nm wavelength light beam generated from the laser diode 3 is divided by the diffraction grating 6' into a zeroth order light component (transmission light component), a +1st order diffraction light component and a −1st order diffraction light component, which are converged by the coupling lens 7'. Most of the converged light beam of the coupling lens 7' is transmitted through the beam splitter 5C. Then, the light beam transmitted through the beam splitter 5C is reflected by the mirror 8 to reach the collimator lens 9 for converting the light beam passed therethrough into a collimated light beam. The collimated light beam is converted by the quarter-wave plate 10 from a linearly-polarized (P-polarized) light mode into a circularly-polarized light mode, and then, is focussed by the objective lens 11 at the disk 1 which is, in this case, a CD.

The light beam reflected by the disk 1 is returned by the objective lens 11 to the quarter-wave plate 10. As a result, the mode of the light beam is converted from the circularly-polarized light mode into a linearly-polarized (S-polarized) light mode. Then, the S-polarized light beam is reflected by the mirror 8 and is reflected by the beam splitter 5C. Then, the light beam reflected by the beam splitter 5C is transmitted through the beam splitter 5B, and further passes through the compound lens 12 to reach the photodetector 4.

In the optical head apparatus of FIG. 12, since losses of the intensity of the outgoing and incoming light beams hardly occur in the beam splitters 5B and 5C, the S/N ratio would be increased. Additionally, as stated above, the manufacturing margin of the beam splitters 5B and 5C is large, so that the manufacturing cost thereof can be decreased.

Figure 13:
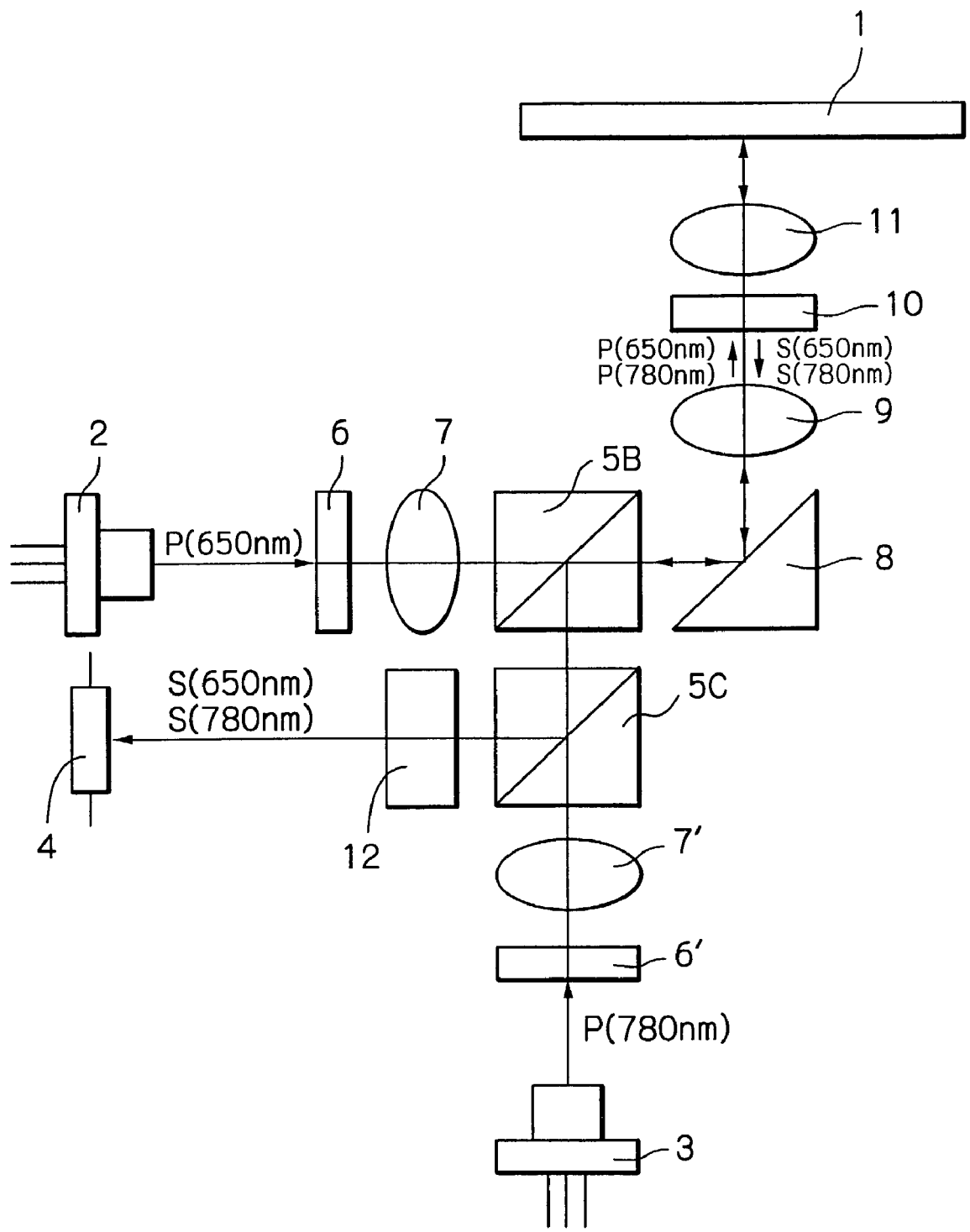
FIG. 13 is a diagram illustrating a modification of the optical head apparatus of FIG. 12.

In FIG. 13, which illustrates a modification of the optical head apparatus of FIG. 12, the locations of the laser diode 2, the diffraction grating 6, the coupling lens 7 and the beam splitter 5B of FIG. 12 are exchanged with the locations of the laser diode 3, the diffraction grating 6', the coupling lens 7' and the beam splitter 5C, respectively, of FIG. 12. The operation of the optical head apparatus of FIG. 13 is similar to that of the optical head apparatus of FIG. 12.

Figure 14:
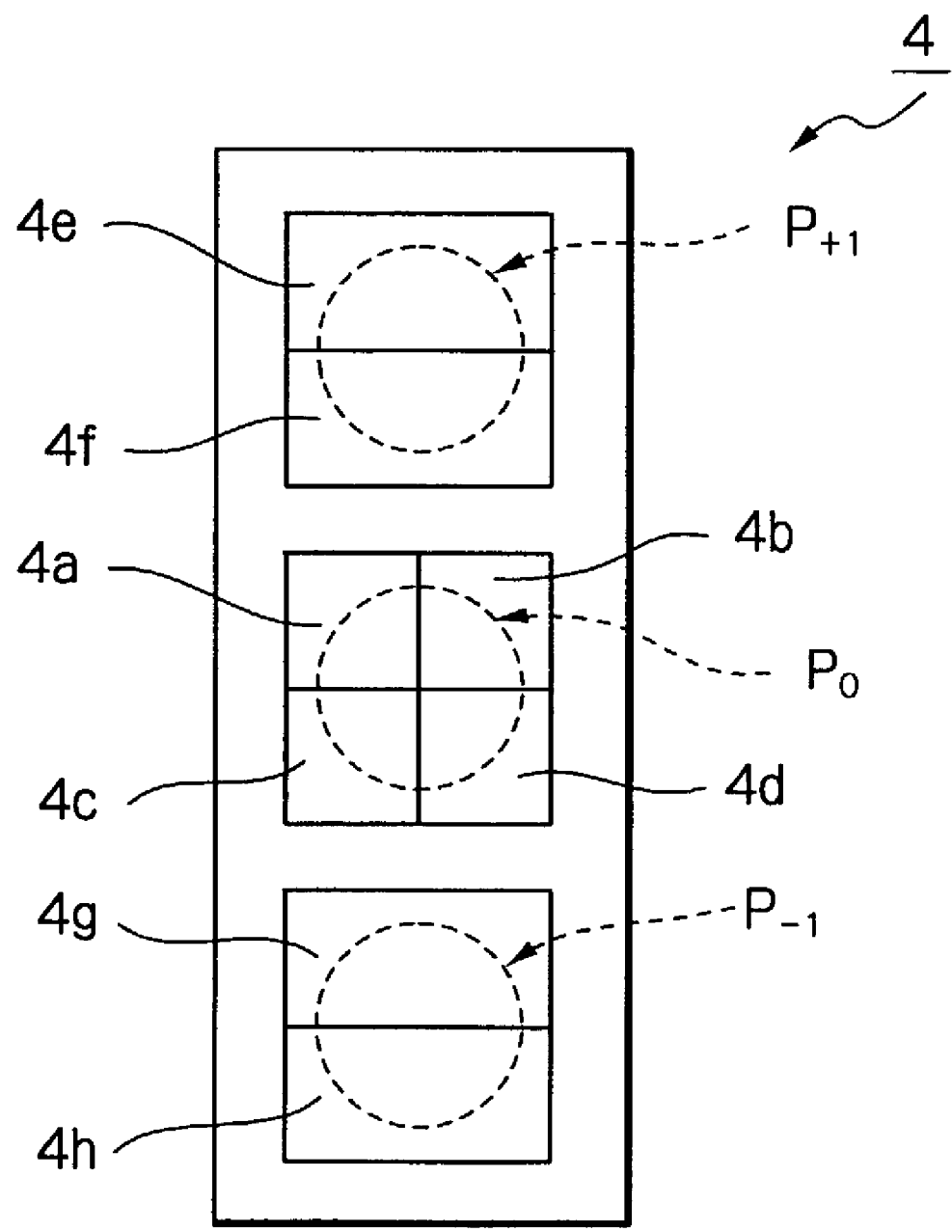
FIG. 14 is an enlarged plan view of the photodetector of FIGS. 6 through 13.

In FIG. 14, which is an enlarged plan view of the photodetector 4 of FIGS. 6 through 13, reference numerals 4a through 4h designate photodetecting portions. The zeroth order light beam from the laser diode 2 or 3 forms a light beam spot PO on the photodetecting portions 4a, 4b, 4c and 4d. Also, the +1st order diffraction light beam from the laser diode 2 or 3 forms a light beam spot $P_{+1}$ on the photodetecting portions 4e and 4f. Further, the −1st order diffraction light beam from the laser diode 2 or 3 forms a light beam spot $P_{-1}$ on the photodetecting portions 4g and 4h.

In the photodetector 4, a focus error signal $V_f$ is calculated by using a known astigmatism method:

$$V_f = V(4a) + V(4d) - V(4b) - V(4c)$$

Also, a track error signal $V_t$ for a recordable DVD or a CD is calculated by using a known push-pull method:

$$V(4a)+V(4b)-V(4c)-V(4d)-K(V(4e)+V(4g)-V(4f)-V(4h))$$

where K is a constant.

On the other hand, a track error signal $V_t$ for a read-only DVD is calculated by using a known differential phase detection method, i.e., a difference in phase between $V(4a)+V(4d)$ and $V(4b)+V(4c)$.

Further, an RF information $V_r$ is calculated by $$V_r = V(4a)+V(4b)+V(4c)+V(4d)$$

In the above-described embodiments, the quarter-wave plate 10 is a broadband quarter-wave plate for the 650 nm wavelength and the 780 nm wavelength, which is disclosed in JP-A-5-100114. Also, the coupling lenses 7 and 7' are provided to converge the outgoing light beams, which would enhance the light output of the objective lens 11. Also, the locations of the coupling lenses 7 and 7' are adjusted in order to adjust the light beams to be collimated. In this case, although the location of the collimator lens 9 can be adjusted, it is better to adjust the locations of the coupling lenses 7 and 7', since the diameter of the collimator lens 9 is much larger than that of the coupling lenses 7 and 7'.

As explained hereinabove, according to the present invention, since losses of the intensity of the outgoing and incoming light beams hardly occur in the beam splitters, the S/N ratio would be increased. Additionally, since the manufacturing margin of the beam splitters is large, the manufacturing cost thereof can be decreased.

What is claimed is:

1. An optical head apparatus, comprising:
   a first light source for emitting a first light beam having a first wavelength;
   a second light source for emitting a second light beam having a second wavelength different from said first wavelength;
   an objective lens;
   a photodetector;
   first and second optical combining/splitting elements,
   said first optical combining/splitting element receiving said first light beam from said first light source to transmit or reflect most of said first light beam therefrom to said second optical combining/splitting element and receiving said first and second light beams from said second optical combining/splitting element to transmit or reflect most of said first and second light beams therefrom to said photodetector,
   said second optical combining/splitting element receiving said first light beam from said first optical combining/splitting element and said second light beam from said second light source to transmit or reflect most of said first and second light beams therefrom to said objective lens and receiving said first and second light beams from said objective lens to transmit or reflect most of said first and second light beams therefrom to said first optical combining/splitting element; and
   a quarter-wave plate disposed between said second optical combining/splitting element and said objective lens, said quarter-wave plate converting said first and second light beams having said first and second wavelengths between a linearly-polarized light mode and a circularly-polarized light mode.

2. The apparatus as set forth in claim 1, wherein most of said first light beam is more than 90% of said first light beam, and most of said second light beam is more than 90% of said second light beam.

3. The apparatus as set forth in claim 1, wherein said first optical combining/splitting element comprises a first polarizing beam splitter for said first wavelength, said second optical combining/splitting element comprising a second polarizing beam splitter for said second wavelength.

4. The apparatus as set forth in claim 3, wherein said first wavelength is shorter than said second wavelength.

5. The apparatus as set forth in claim 4, wherein said quarter-wave plate is a broadband quarter-wave plate located between said second polarizing beam splitter and said objective lens, said broadband quarter-wave plate being adapted to said first wavelength and said second wavelength,
   said first light source emitting an S-polarized light beam of said first wavelength,
   said second light source emitting an S-polarized light beam of said second wavelength,
   said first polarizing beam splitter transmitting most of P-polarized light beams of said first wavelength and P-polarized and S-polarized light beams of said second wavelength therethrough and reflecting most of S-polarized light beams of said first wavelength thereby,
   said second polarizing beam splitter transmitting most of P-polarized and S-polarized light beams of said first wavelength and P-polarized light beams of said second wavelength therethrough and reflecting most of S-polarized light beams of said second wavelength thereby.

6. The apparatus as set forth in claim 4, wherein said quarter-wave plate is a broadband quarter-wave plate located between said second polarizing beam splitter and said objective lens, said broadband quarter-wave plate being adapted to said first wavelength and said second wavelength,
   said first light source emitting a P-polarized light beam of said first wavelength,
   said second light source emitting an S-polarized light beam of said second wavelength,
   said first polarizing beam splitter transmitting most of P-polarized light beams of said first wavelength therethrough and reflecting most of S-polarized light beams of said first wavelength and P-polarized and S-polarized light beams of said second wavelength thereby,
   said second polarizing beam splitter transmitting most of P-polarized and S-polarized light beams of said first wavelength and P-polarized light beams of said second wavelength therethrough and reflecting most of S-polarized light beams of said second wavelength thereby.

7. The apparatus as set forth in claim 4, wherein said quarter-wave plate is a broadband quarter-wave plate located between said second polarizing beam splitter and said objective lens, said broadband quarter-wave plate being adapted to said first wavelength and said second wavelength,
   said first light source emitting an S-polarized light beam of said first wavelength,
   said second light source emitting a P-polarized light beam of said second wavelength,
   said first polarizing beam splitter transmitting most of P-polarized light beams of said first wavelength and P-polarized and S-polarized light beams of said second wavelength therethrough and reflecting most of S-polarized light beams of said first wavelength thereby,
   said second polarizing beam splitter transmitting most of P-polarized light beams of said second wavelength therethrough and reflecting most of P-polarized and S-polarized light beams of said first wavelength and S-polarized light beams of said second wavelength thereby.

8. The apparatus as set forth in claim 4, wherein said quarter-wave plate is a broadband quarter-wave plate located between said second polarizing beam splitter and said objective lens, said broadband quarter-wave plate being adapted to said first wavelength and said second wavelength,
said first light source emitting a P-polarized light beam of said first wavelength,
said second light source emitting a P-polarized light beam of said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized light beams of said second wavelength therethrough and reflecting most of P-polarized and S-polarized light beams of said first wavelength and S-polarized light beams of said second wavelength thereby.

9. The apparatus as set forth in claim 3, wherein said first wavelength is longer than said second wavelength.

10. The apparatus as set forth in claim 9, wherein said quarter-wave plate is a broadband quarter-wave plate located between said second polarizing beam splitter and said objective lens, said broadband quarter-wave plate being adapted to said first wavelength and said second wavelength,
said first light source emitting an S-polarized light beam of said first wavelength,
said second light source emitting an S-polarized light beam of said second wavelength,
said first polarizing beam splitter transmitting most of P-polarized light beams of said first wavelength and P-polarized and S-polarized light beams of said second wavelength therethrough and reflecting most of S-polarized light beams of said first wavelength thereby,
said second polarizing beam splitter transmitting most of P-polarized and S-polarized light beams of said first wavelength and P-polarized light beams of said second wavelength therethrough and reflecting most of S-polarized light beams of said second wavelength thereby.

11. The apparatus as set forth in claim 9, wherein said quarter-wave plate is a broadband quarter-wave plate located between said second polarizing beam splitter and said objective lens, said broadband quarter-wave plate being adapted to said first wavelength and said second wavelength,
said first light source emitting a P-polarized light beam of said first wavelength,
said second light source emitting an S-polarized light beam of said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized and S-polarized light beams of said first wavelength and P-polarized light beams of said second wavelength therethrough and reflecting most of S-polarized light beams of said second wavelength thereby.

12. The apparatus as set forth in claim 9, wherein said quarter-wave plate is a broadband quarter-wave plate located between said second polarizing beam splitter and said objective lens, said broadband quarter-wave plate being adapted to said first wavelength and said second wavelength.
said first light source emitting an S-polarized light beam of said first wavelength,
said second light source emitting a P-polarized light beam of said second wavelength,
said first polarizing beam splitter transmitting most of P-polarized light beams of said first wavelength and P-polarized and S-polarized light beams of said second wavelength therethrough and reflecting most of S-polarized light beams of said first wavelength thereby,
said second polarizing beam splitter transmitting most of P-polarized light beams of said second wavelength therethrough and reflecting most of P-polarized and S-polarized light beams of said first wavelength and S-polarized light beams of said second wavelength thereby.

13. The apparatus as set forth in claim 9, wherein said quarter-wave plate is a broadband quarter-wave plate located between said second polarizing beam splitter and said objective lens, said broadband quarter-wave plate being adapted to said first wavelength and said second wavelength,
said first light source emitting a P-polarized light beam of said first wavelength,
said second light source emitting a P-polarized light beam of said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized light beams of said second wavelength therethrough and reflecting most of P-polarized and S-polarized light beams of said first wavelength and S-polarized light beams of said second wavelength thereby.

14. The apparatus as set forth in claim 1, further comprising a collimator lens located between said second optical combining/splitting element and objective lens.

15. The apparatus as set forth in claim 1, further comprising:
a first coupling lens, located between said first light source and said first optical combining/splitting element, for converging a light beam through said first coupling lens; and
a second coupling lens, located between said second light source and said second optical combining/splitting element, for converging a light beam through said second coupling lens.

16. The apparatus as set forth in claim 4, wherein said first wavelength is around 650 nm, and said second wavelength is around 780 nm.

17. The apparatus as set forth in claim 9, wherein said first wavelength is around 780 nm, and said second wavelength is around 650 nm.

18. An optical head apparatus comprising:
a first light source for emitting an S-polarized light beam having a first wavelength;
a second light source for emitting an S-polarized light beam having a second wavelength longer than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength, said first polarizing beam splitter transmitting most of P-polarized light beams of said first wavelength and P-polarized and S-polarized light beams of said second wavelength therethrough and reflecting most of S-polarized light beams of said first wavelength thereby, said second polarizing beam splitter transmitting most of P-polarized and S-polarized light beams of said first wavelength and P-polarized light beams of said second wavelength therethrough and reflecting most of S-polarized light beams of said second wavelength thereby.

19. An optical head apparatus comprising:
a first light source for emitting a P-polarized light beam having a first wavelength;
a second light source for emitting an S-polarized light beam having a second wavelength longer than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized and S-polarized light beams of said first wavelength and P-polarized light beams of said second wavelength therethrough and reflecting most of S-polarized light beams of said second wavelength thereby.

20. An optical head apparatus comprising:
a first light source for emitting an S-polarized light beam having a first wavelength;
a second light source for emitting a P-polarized light beam having a second wavelength longer than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength,
said first polarizing beam splitter transmitting most of P-polarized light beams of said first wavelength and P-polarized and S-polarized light beams of said second wavelength therethrough and reflecting most of S-polarized light beams of said first wavelength thereby,
said second polarizing beam splitter transmitting most of P-polarized light beams of said second wavelength therethrough and reflecting most of P-polarized and S-polarized light beams of said first wavelength and S-polarized light beams of said second wavelength thereby.

21. An optical head apparatus comprising:
a first light source for emitting a P-polarized light beam having a first wavelength;
a second light source for emitting a P-polarized light beam having a second wavelength longer than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized light beams of said second wavelength therethrough and reflecting most of P-polarized and S-polarized light beams of said first wavelength and S-polarized light beams of said second wavelength thereby.

22. An optical head apparatus comprising:
a first light source for emitting an S-polarized light beam having a first wavelength;
a second light source for emitting an S-polarized light beam having a second wavelength shorter than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength,
said first polarizing beam splitter transmitting most of P-polarized light beams of said first wavelength and P-polarized and S-polarized light beams of said second wavelength therethrough and reflecting most of S-polarized light beams of said first wavelength thereby,
said second polarizing beam splitter transmitting most of P-polarized and S-polarized light beams of said first wavelength and P-polarized light beams of said second wavelength therethrough and reflecting most of S-polarized light beams of said second wavelength thereby.

23. An optical head apparatus comprising:
a first light source for emitting a P-polarized light beam having a first wavelength;
a second light source for emitting an S-polarized light beam having a second wavelength shorter than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength,
said first polarizing beam splitter transmitting most of P-polarized light beams of said first wavelength therethrough and reflecting most of S-polarized light beams of said first wavelength and P-polarized and S-polarized light beams of said second wavelength thereby,
said second polarizing beam splitter transmitting most of P-polarized and S-polarized light beams of said first wavelength and P-polarized light beams of said second wavelength therethrough and reflecting most of S-polarized light beams of said second wavelength thereby.

24. An optical head apparatus comprising:
a first light source for emitting an S-polarized light beam having a first wavelength;
a second light source for emitting a P-polarized light beam having a second wavelength shorter than said first wavelength;
an objective lens;
first and second polarizing beam splitters; and
a broadband quarter-wave plate located between said second polarizing beam splitter and said objective lens, said broadband quarter-wave plate being adapted to said first wavelength and said second wavelength, said first polarizing beam splitter transmitting most of P-polarized light beams of said first wavelength and P-polarized and S-polarized light beams of said second wavelength therethrough and reflecting most of S-polarized light beams of said first wavelength thereby, said second polarizing beam splitter transmitting most of P-polarized light beams of said second wavelength therethrough and reflecting most of P-polarized and S-polarized light beams of said first wavelength and S-polarized light beams of said second wavelength thereby.

25. An optical head apparatus comprising:

a first light source for emitting a P-polarized light beam having a first wavelength;

a second light source for emitting a P-polarized light beam having a second wavelength shorter than said first wavelength;

an objective lens;

first and second polarizing beam splitters; and a broadband quarter-wave plate located between said second polarizing beam splitter and said objective lens, said broadband quarter-wave plate being adapted to said first wavelength and said second wavelength, said first polarizing beam splitter transmitting most of P-polarized light beams of said first wavelength therethrough and reflecting most of S-polarized light beams of said first wavelength and P-polarized and S-polarized light beams of said second wavelength thereby, said second polarizing beam splitter transmitting most of P-polarized light beams of said second wavelength therethrough and reflecting most of P-polarized and S-polarized light beams of said first wavelength and S-polarized light beams of said second wavelength thereby.

* * * * *